US009702424B2

(12) United States Patent
Zuckerman et al.

(10) Patent No.: US 9,702,424 B2
(45) Date of Patent: Jul. 11, 2017

(54) HYDRAULIC DAMPER, HYDRAULIC BUMP-STOP AND DIVERTER VALVE

(71) Applicant: Levant Power Corporation, Woburn, MA (US)

(72) Inventors: Richard Anthony Zuckerman, Somerville, MA (US); Clive Tucker, Charlestown, MA (US); Colin Patrick O'Shea, Cambridge, MA (US); Jack A. Ekchian, Belmont, MA (US)

(73) Assignee: ClearMotion, Inc., Woburn, MA (US)

( * ) Notice: Subject to any disclaimer, the term of this patent is extended or adjusted under 35 U.S.C. 154(b) by 147 days.

(21) Appl. No.: 14/876,796

(22) Filed: Oct. 6, 2015

(65) Prior Publication Data

US 2016/0097406 A1    Apr. 7, 2016

Related U.S. Application Data

(60) Provisional application No. 62/104,662, filed on Jan. 16, 2015, provisional application No. 62/076,558, (Continued)

(51) Int. Cl.
*B60G 17/056* (2006.01)
*F16F 9/00* (2006.01)
(Continued)

(52) U.S. Cl.
CPC .............. *F16F 9/00* (2013.01); *B60G 17/056* (2013.01); *B60G 2202/413* (2013.01);
(Continued)

(58) Field of Classification Search
CPC ......... F15B 15/22; F16K 11/065; F16K 31/12
(Continued)

(56) References Cited

U.S. PATENT DOCUMENTS 998,128 A     7/1911  Smith
1,116,293 A   11/1914 Kane
(Continued)

FOREIGN PATENT DOCUMENTS

CN    1325799 A    12/2001
CN    1370926 A    9/2002
(Continued)

OTHER PUBLICATIONS

[No Author Listed] Ride control innovation, accelerated[SM]. Forward thinking. Forward moving. ACOCAR. Tenneco. Sep. 2011.
(Continued)

*Primary Examiner* — Thomas E Lazo
(74) *Attorney, Agent, or Firm* — Wolf, Greenfield & Sacks, P.C.

(57) ABSTRACT

Hydraulic bump stops and bi-directional diverter valves may be used to protect hydraulic systems, including, for example in one embodiment, the hydraulic actuators of an active suspension system, from damage due to operation outside the normal operating range of the system. In some embodiments, a hydraulic bump stop may be used to slow down the motion of a piston at the extremes of the compression and/or extension strokes of an actuator. In another embodiment, a diverter valve may be used to protect a hydraulic motor/pump in a hydraulic system from an over-speed condition. When the piston in an active suspension system actuator moves at a speed in excess of a threshold value, one or more diverter valves may be used to divert flow away from the hydraulic motor/pump. In some embodiments, a diverter valve may be a dual or single spool bi-directional diverter valve.

15 Claims, 36 Drawing Sheets

Related U.S. Application Data filed on Nov. 7, 2014, provisional application No. 62/060,228, filed on Oct. 6, 2014.

(51) Int. Cl.
*F16K 11/065* (2006.01)
*F16K 31/12* (2006.01)

(52) U.S. Cl.
CPC .... *B60G 2202/416* (2013.01); *B60G 2204/45* (2013.01); *F16K 11/065* (2013.01); *F16K 31/12* (2013.01)

(58) Field of Classification Search
USPC .......................................................... 91/392
See application file for complete search history.

(56) References Cited

U.S. PATENT DOCUMENTS

| | | |
|---|---|---|
| 1,290,293 A | 1/1919 | Morski |
| 2,194,530 A | 3/1940 | Torstensson |
| 2,885,202 A | 5/1959 | Trumper et al. |
| 2,958,292 A | 11/1960 | Lipe et al. |
| 3,507,580 A | 4/1970 | Howard et al. |
| 3,515,889 A | 6/1970 | Kammerer |
| 3,559,027 A | 1/1971 | Arsem |
| 3,688,859 A | 9/1972 | Hudspeth et al. |
| 3,800,202 A | 3/1974 | Oswald |
| 3,803,906 A | 4/1974 | Ross |
| 3,805,833 A | 4/1974 | Teed |
| 3,921,746 A | 11/1975 | Lewus |
| 3,947,004 A | 3/1976 | Taylor |
| 4,032,829 A | 6/1977 | Schenavar |
| 4,033,580 A | 7/1977 | Paris |
| 4,216,420 A | 8/1980 | Jinbo et al. |
| 4,295,538 A | 10/1981 | Lewus |
| 4,401,926 A | 8/1983 | Morton et al. |
| 4,480,709 A | 11/1984 | Commanda |
| 4,500,827 A | 2/1985 | Merritt et al. |
| 4,606,551 A | 8/1986 | Toti et al. |
| 4,625,993 A | 12/1986 | Williams et al. |
| 4,673,194 A | 6/1987 | Sugasawa |
| 4,729,459 A | 3/1988 | Inagaki et al. |
| 4,740,711 A | 4/1988 | Sato et al. |
| 4,815,575 A | 3/1989 | Murty |
| 4,857,755 A | 8/1989 | Comstock |
| 4,872,701 A | 10/1989 | Akatsu et al. |
| 4,887,699 A | 12/1989 | Ivers et al. |
| 4,908,553 A | 3/1990 | Hoppie et al. |
| 4,921,080 A | 5/1990 | Lin |
| 4,924,393 A | 5/1990 | Kurosawa |
| 4,936,423 A | 6/1990 | Karnopp |
| 4,981,309 A | 1/1991 | Froeschle et al. |
| 5,022,429 A * | 6/1991 | Rollini .................... E03C 1/104 137/218 |
| 5,034,890 A | 7/1991 | Sugasawa et al. |
| 5,046,309 A | 9/1991 | Yoshino et al. |
| 5,060,959 A | 10/1991 | Davis et al. |
| 5,091,679 A | 2/1992 | Murty et al. |
| 5,098,119 A | 3/1992 | Williams et al. |
| 5,102,161 A | 4/1992 | Williams |
| 5,145,206 A | 9/1992 | Williams |
| 5,203,199 A | 4/1993 | Henderson et al. |
| 5,215,327 A | 6/1993 | Gatter et al. |
| 5,232,242 A | 8/1993 | Bachrach et al. |
| 5,243,525 A | 9/1993 | Tsutsumi et al. |
| 5,276,622 A | 1/1994 | Miller et al. |
| 5,291,960 A | 3/1994 | Brandenburg et al. |
| 5,295,563 A | 3/1994 | Bennett |
| 5,295,705 A | 3/1994 | Butsuen et al. |
| 5,337,560 A | 8/1994 | Abdelmalek et al. |
| 5,360,445 A | 11/1994 | Goldowsky |
| 5,377,791 A | 1/1995 | Kawashima et al. |
| 5,391,953 A | 2/1995 | Van de Veen |
| 5,425,436 A | 6/1995 | Teramura et al. |
| 5,480,186 A | 1/1996 | Smith |
| 5,497,324 A | 3/1996 | Henry et al. |
| 5,529,152 A | 6/1996 | Hamilton et al. |
| 5,570,286 A | 10/1996 | Margolis et al. |
| 5,572,425 A | 11/1996 | Levitt et al. |
| 5,590,734 A | 1/1997 | Caires |
| 5,608,308 A | 3/1997 | Kiuchi et al. |
| 5,641,152 A | 6/1997 | Angles et al. |
| 5,659,205 A | 8/1997 | Weisser et al. |
| 5,682,980 A | 11/1997 | Reybrouck |
| 5,684,383 A | 11/1997 | Tsuji et al. |
| 5,701,245 A | 12/1997 | Ogawa et al. |
| 5,717,303 A | 2/1998 | Engel |
| 5,764,009 A | 6/1998 | Fukaya et al. |
| 5,794,168 A | 8/1998 | Sasaki et al. |
| 5,794,439 A | 8/1998 | Lisniansky |
| 5,839,800 A | 11/1998 | Koga et al. |
| 5,856,709 A | 1/1999 | Ibaraki et al. |
| 5,892,293 A | 4/1999 | Lucas |
| 5,941,328 A | 8/1999 | Lyons et al. |
| 5,944,153 A | 8/1999 | Ichimaru |
| 5,987,368 A | 11/1999 | Kamimae et al. |
| 5,999,868 A | 12/1999 | Beno et al. |
| 6,025,665 A | 2/2000 | Poag et al. |
| 6,049,746 A | 4/2000 | Southward et al. |
| 6,092,618 A | 7/2000 | Collier-Hallman |
| 6,111,375 A | 8/2000 | Zenobi |
| 6,161,844 A | 12/2000 | Charaudeau et al. |
| 6,190,319 B1 | 2/2001 | Goldowsky |
| 6,227,817 B1 | 5/2001 | Paden |
| 6,282,453 B1 | 8/2001 | Lombardi |
| 6,290,034 B1 | 9/2001 | Ichimaru |
| 6,314,353 B1 | 11/2001 | Ohsaku et al. |
| 6,349,543 B1 | 2/2002 | Lisniansky |
| 6,394,238 B1 | 5/2002 | Rogala |
| 6,397,134 B1 | 5/2002 | Shal et al. |
| 6,441,508 B1 | 8/2002 | Hylton |
| 6,452,535 B1 | 9/2002 | Rao et al. |
| 6,502,837 B1 | 1/2003 | Hamilton et al. |
| 6,519,517 B1 | 2/2003 | Heyring et al. |
| 6,519,939 B1 | 2/2003 | Duff |
| 6,559,553 B2 | 5/2003 | Yumita |
| 6,575,484 B2 | 6/2003 | Rogala et al. |
| 6,592,060 B1 | 7/2003 | Vomhof et al. |
| 6,631,960 B2 | 10/2003 | Grand et al. |
| 6,765,389 B1 | 7/2004 | Moore |
| 6,876,100 B2 | 4/2005 | Yumita |
| 6,908,162 B2 | 6/2005 | Obayashi et al. |
| 6,920,951 B2 | 7/2005 | Song et al. |
| 6,944,544 B1 | 9/2005 | Prakah-Asante et al. |
| 6,952,060 B2 | 10/2005 | Goldner |
| 6,964,325 B2 | 11/2005 | Maes |
| 6,973,880 B2 | 12/2005 | Kumar |
| 7,015,594 B2 | 3/2006 | Asada |
| 7,023,107 B2 | 4/2006 | Okuda et al. |
| 7,034,482 B2 | 4/2006 | Komiyama et al. |
| 7,051,526 B2 | 5/2006 | Geiger |
| 7,087,342 B2 | 8/2006 | Song |
| 7,156,406 B2 | 1/2007 | Kraus et al. |
| 7,195,250 B2 | 3/2007 | Knox et al. |
| 7,206,678 B2 | 4/2007 | Arduc et al. |
| 7,335,999 B2 | 2/2008 | Potter |
| 7,336,002 B2 | 2/2008 | Kato et al. |
| 7,392,998 B2 | 7/2008 | Runkel |
| 7,421,954 B2 | 9/2008 | Bose |
| 7,427,072 B2 | 9/2008 | Brown |
| 7,513,490 B2 | 4/2009 | Robertson |
| 7,533,890 B2 | 5/2009 | Chiao |
| 7,656,055 B2 | 2/2010 | Torres et al. |
| 7,722,056 B2 | 5/2010 | Inoue et al. |
| 7,854,203 B2 | 12/2010 | Kumar |
| 7,936,113 B2 | 5/2011 | Namuduri et al. |
| 7,938,217 B2 | 5/2011 | Stansbury |
| 7,963,529 B2 | 6/2011 | Oteman et al. |
| 8,063,498 B2 | 11/2011 | Namuduri et al. |
| 8,067,863 B2 | 11/2011 | Giovanardi |
| 8,079,436 B2 | 12/2011 | Tikkanen et al. |
| 8,080,888 B1 | 12/2011 | Daley |
| 8,167,319 B2 | 5/2012 | Ogawa |

(56) References Cited

U.S. PATENT DOCUMENTS

| | | |
|---|---|---|
| 8,253,281 B2 | 8/2012 | Namuduri et al. |
| 8,255,117 B2 | 8/2012 | Bujak et al. |
| 8,269,359 B2 | 9/2012 | Boisvert et al. |
| 8,269,360 B2 | 9/2012 | Boisvert et al. |
| 8,376,100 B2 | 2/2013 | Avadhany et al. |
| 8,380,416 B2 | 2/2013 | Offerle et al. |
| 8,392,030 B2 | 3/2013 | Anderson et al. |
| 8,453,809 B2 | 6/2013 | Hall |
| 8,475,137 B2 | 7/2013 | Kobayashi et al. |
| 8,548,678 B2 | 10/2013 | Ummethala et al. |
| 8,590,679 B2 | 11/2013 | Hall |
| 8,596,055 B2 | 12/2013 | Kadlicko |
| 8,672,337 B2 | 3/2014 | van Der Knaap et al. |
| 8,776,961 B2 | 7/2014 | Mori et al. |
| 8,820,064 B2 | 9/2014 | Six et al. |
| 8,839,920 B2 | 9/2014 | Bavetta et al. |
| 8,840,118 B1 | 9/2014 | Giovanardi et al. |
| 8,841,786 B2 | 9/2014 | Tucker et al. |
| 8,892,304 B2 | 11/2014 | Lu et al. |
| 8,966,889 B2 | 3/2015 | Six |
| 9,035,477 B2 | 5/2015 | Tucker et al. |
| 9,108,484 B2 | 8/2015 | Reybrouck |
| 9,174,508 B2 | 11/2015 | Anderson et al. |
| 9,205,718 B2 | 12/2015 | Lee |
| 9,260,011 B2 | 2/2016 | Anderson et al. |
| 9,440,507 B2 | 9/2016 | Giovanardi et al. |
| 9,550,404 B2 | 1/2017 | Giovanardi et al. |
| 2001/0033047 A1 | 10/2001 | Beck et al. |
| 2002/0047273 A1 | 4/2002 | Burns et al. |
| 2002/0060551 A1 | 5/2002 | Ikeda |
| 2002/0070510 A1 | 6/2002 | Rogala |
| 2002/0074175 A1 | 6/2002 | Bloxham |
| 2002/0145404 A1 | 10/2002 | Dasgupta et al. |
| 2002/0183907 A1 | 12/2002 | Stiller |
| 2003/0000765 A1 | 1/2003 | Spadafora |
| 2003/0034697 A1 | 2/2003 | Goldner et al. |
| 2003/0077183 A1 | 4/2003 | Franchet et al. |
| 2003/0150352 A1 | 8/2003 | Kumar |
| 2003/0169048 A1 | 9/2003 | Kim et al. |
| 2004/0083629 A1 | 5/2004 | Kondou |
| 2004/0096334 A1 | 5/2004 | Aldinger et al. |
| 2004/0119289 A1 | 6/2004 | Zabramny |
| 2004/0207350 A1 | 10/2004 | Wilton et al. |
| 2004/0211631 A1 | 10/2004 | Hsu |
| 2004/0212273 A1 | 10/2004 | Gould |
| 2005/0017462 A1 | 1/2005 | Kroppe |
| 2005/0121268 A1 | 6/2005 | Groves et al. |
| 2005/0146098 A1* | 7/2005 | Green ................ B60G 17/0162 280/5.508 |
| 2005/0178628 A1 | 8/2005 | Uchino et al. |
| 2005/0280318 A1 | 12/2005 | Parison et al. |
| 2006/0090462 A1 | 5/2006 | Yoshino |
| 2006/0178808 A1 | 8/2006 | Wu et al. |
| 2006/0239849 A1 | 10/2006 | Heltzapple et al. |
| 2007/0018626 A1 | 1/2007 | Chi |
| 2007/0021886 A1 | 1/2007 | Miyajima |
| 2007/0088475 A1 | 4/2007 | Nordgren et al. |
| 2007/0089919 A1 | 4/2007 | de la Torre et al. |
| 2007/0089924 A1 | 4/2007 | de la Torre et al. |
| 2007/0120332 A1 | 5/2007 | Bushko et al. |
| 2007/0233279 A1 | 10/2007 | Kazerooni et al. |
| 2008/0004771 A1 | 1/2008 | Masamura |
| 2008/0012262 A1 | 1/2008 | Carabelli |
| 2008/0111324 A1 | 5/2008 | Davis |
| 2008/0190104 A1 | 8/2008 | Bresie |
| 2008/0234900 A1 | 9/2008 | Bennett |
| 2008/0238396 A1 | 10/2008 | Ng et al. |
| 2008/0257626 A1 | 10/2008 | Carabelli et al. |
| 2009/0015202 A1 | 1/2009 | Miura et al. |
| 2009/0192674 A1 | 7/2009 | Simons |
| 2009/0212649 A1 | 8/2009 | Kingman et al. |
| 2009/0229902 A1 | 9/2009 | Stansbury |
| 2009/0230688 A1 | 9/2009 | Torres et al. |
| 2009/0234537 A1 | 9/2009 | Tomida et al. |
| 2009/0260935 A1 | 10/2009 | Avadhany et al. |
| 2010/0013229 A1 | 1/2010 | Da Costa |
| 2010/0044978 A1 | 2/2010 | Delorenzis et al. |
| 2010/0072760 A1 | 3/2010 | Bavetta et al. |
| 2010/0217491 A1 | 8/2010 | Naito et al. |
| 2010/0244457 A1 | 9/2010 | Bhat et al. |
| 2010/0262308 A1 | 10/2010 | Anderson et al. |
| 2010/0308589 A1 | 12/2010 | Rohrer |
| 2011/0024601 A1 | 2/2011 | Shoemaker et al. |
| 2011/0127127 A1 | 6/2011 | Hirao et al. |
| 2011/0162903 A1 | 7/2011 | Stragier |
| 2011/0303049 A1 | 12/2011 | Neelakantan et al. |
| 2012/0010780 A1 | 1/2012 | Hayashi et al. |
| 2012/0055745 A1 | 3/2012 | Buettner et al. |
| 2012/0078470 A1 | 3/2012 | Hirao et al. |
| 2012/0181757 A1 | 7/2012 | Oteman et al. |
| 2012/0230850 A1 | 9/2012 | Kawano et al. |
| 2012/0305347 A1 | 12/2012 | Mori et al. |
| 2013/0147205 A1 | 6/2013 | Tucker et al. |
| 2013/0154280 A1 | 6/2013 | Wendell et al. |
| 2013/0221625 A1 | 8/2013 | Pare et al. |
| 2013/0264158 A1 | 10/2013 | Hall |
| 2014/0005888 A1 | 1/2014 | Bose et al. |
| 2014/0012467 A1 | 1/2014 | Knox et al. |
| 2014/0012468 A1 | 1/2014 | Le et al. |
| 2014/0095022 A1 | 4/2014 | Cashman et al. |
| 2014/0260233 A1 | 9/2014 | Giovanardi et al. |
| 2014/0265169 A1 | 9/2014 | Giovanardi et al. |
| 2014/0265170 A1 | 9/2014 | Giovanardi et al. |
| 2014/0271066 A1 | 9/2014 | Hou |
| 2014/0288776 A1 | 9/2014 | Anderson et al. |
| 2014/0294601 A1 | 10/2014 | O'Shea et al. |
| 2014/0294625 A1 | 10/2014 | Tucker et al. |
| 2014/0297113 A1 | 10/2014 | Zuckerman et al. |
| 2014/0297116 A1 | 10/2014 | Anderson et al. |
| 2014/0297117 A1 | 10/2014 | Near et al. |
| 2014/0297119 A1 | 10/2014 | Giovanardi et al. |
| 2014/0346783 A1 | 11/2014 | Anderson et al. |
| 2015/0192114 A1 | 7/2015 | Triebel et al. |
| 2015/0224845 A1 | 8/2015 | Anderson et al. |
| 2015/0316039 A1 | 11/2015 | Tucker et al. |
| 2016/0031285 A1 | 2/2016 | Tucker et al. |
| 2016/0059664 A1 | 3/2016 | Tucker et al. |
| 2016/0075205 A1 | 3/2016 | Anderson et al. |
| 2016/0114643 A1 | 4/2016 | Anderson et al. |

FOREIGN PATENT DOCUMENTS

| | | |
|---|---|---|
| CN | 2707546 Y | 7/2005 |
| CN | 101104381 A | 1/2008 |
| CN | 201002520 Y | 1/2008 |
| DE | 3937987 A1 | 5/1991 |
| DE | 195 35 752 A1 | 3/1997 |
| EP | 0 363 158 A2 | 4/1990 |
| EP | 1 878 598 | 1/2008 |
| EP | 2 541 070 A1 | 1/2013 |
| FR | 2152111 A | 4/1973 |
| FR | 2346176 A | 10/1977 |
| FR | 2661643 A1 | 11/1991 |
| GB | 652732 | 5/1951 |
| GB | 1070783 | 6/1967 |
| JP | S59-187124 A | 10/1984 |
| JP | 3-123981 U1 | 12/1991 |
| JP | H05-50195 U | 7/1993 |
| JP | 8-226377 A2 | 9/1996 |
| JP | 2001-311452 A | 9/2001 |
| JP | 2003-035254 | 2/2003 |
| JP | 2005-521820 | 7/2005 |
| JP | 2008-536470 A | 9/2008 |
| WO | WO 97/26145 A | 7/1997 |
| WO | WO 2007/071362 A1 | 6/2007 |
| WO | WO 2010/066416 A1 | 6/2010 |
| WO | WO 2011/159874 A2 | 12/2011 |
| WO | WO 2012/167316 A1 | 12/2012 |

(56) References Cited

FOREIGN PATENT DOCUMENTS

OTHER PUBLICATIONS

Cleasby et al., A novel high efficiency electrohydrostatic flight simulator motion system. Fluid Pow Mot Control. Centre for PTMC, UK. 2008;437-449.
Kaminaga et al., Mechanism and Control of knee power augmenting device with backdrivable electro-hydrostatic actuator. 13th World congress Mechanism Machine Science. Jun. 19-25, 2011. 1-10.
Shen et al., Automative electric power and energy mangement—a system approach. Business Briefing: Global Automotive Manufacturing and Technology. 2003:1-5.
Vandersmissen, ACOCAR active suspension. Vehicle Dynamics Expo. Stuttgart, Jul. 5, 2008. 24 pages.
Vandersmissen et al., The new Tenneco ACOCAR active suspension. Vehicle Dynamics Expo. Stuttgart, Jun. 22-24, 2010. 19 pages.

\* cited by examiner

HYDRAULIC DAMPER, HYDRAULIC BUMP-STOP AND DIVERTER VALVE

CROSS REFERENCE TO RELATED APPLICATIONS

This application claims the benefit of priority under 35 U.S.C. §119(e) of U.S. provisional application Ser. No. 62/060,228, filed Oct. 6, 2014, U.S. provisional application Ser. No. 62/076,558, filed Nov. 7, 2014, and U.S. provisional application Ser. No. 62/104,662, filed Jan. 16, 2015, the disclosures of each of which are incorporated by reference in their entirety.

FIELD

Disclosed embodiments are related generally to hydraulic dampers, hydraulic bump stops, and fluid diverter valves.

BACKGROUND

Conventional passive, semi-active, and active hydraulic dampers and shock absorbers typically include a piston and an attached piston rod that move through a cylindrical housing in response to forces applied by the vehicle body, the road surface, and/or a source of hydraulic pressure. Occasionally, operating conditions are such that the piston travel relative to the housing may be excessive, i.e. beyond its normal stroke. Under such circumstances, the piston, or other elements that move relative to the housing, may collide with objects located at either end of the housing that remain stationary relative to the housing. Bump stops, typically fabricated from relatively soft materials, such as for example, rubber or plastic, may be used at one or both ends to diminish the damage that may result from such collisions. However, bump stops made of rubber and other similar materials do not always offer sufficient protection, can be noisy, and can be easily damaged so that they no longer function properly. High forces and temperatures may also cause such bump stops to be extruded and/or migrate from their original configurations, or otherwise interfere with the operation or performance of other components in the housing, such as for example, diverter valves. Repeated impact may also cause pieces of the bump stop to break off and be carried to other parts of the system, for example, in a hydraulic active suspension fluid circuit, which may result in a partial or complete system failure.

When a piston moves through a shock absorber or actuator housing, it typically displaces a quantity of fluid at a rate that is proportional to the speed of the piston. In vehicle active suspension systems, at least one diverter valve may be used to at least partially divert hydraulic fluid displaced by the movement of the piston away from a hydraulic pump that normally would receive this fluid. Such a diverter valve is typically a passive valve that is activated in response to the hydraulic fluid flowing at a rate that exceeds a fluid diversion threshold.

SUMMARY

In some embodiments, a bi-directional hydraulic diverter valve that includes a diverter valve housing, and at least one diverter valve spool that is located at least partially in the diverter valve housing. The spool may be biased towards a closed position, by for example a coil spring. The diverter valve may establish a first fluid flow path that directs fluid flow in at least a first direction and a second direction through the diverter valve housing. In addition, a bypass fluid flow path for fluid flow may be established that redirects at least a portion of the fluid flow that passes through the first fluid flow path. The bypass fluid flow path may be open when the at least one diverter valve spool is in the open or partial open position and the bypass fluid flow path is closed when the at least one diverter valve spool is in a closed position. At a first operating point hydraulic fluid may flow through the first fluid flow path in the first direction when the diverter valve spool and associated bypass flow path are closed. At a second operating point, hydraulic fluid flows through the first fluid flow path in the second direction and the diverter valve spool and associated bypass flow path may be closed. At a third operating point hydraulic fluid flows through the first fluid flow path in at least one of the first direction and the second direction and the diverter valve spool and associated bypass flow path are open. A bi-directional hydraulic diverter valve may have one or more spools.

In some embodiments, a hydraulic actuator includes a housing with an internal volume with a compression volume and an extension volume. These volumes are at least partially filled with hydraulic fluid. A piston is disposed in the housing, where at least a portion of the hydraulic fluid contained in the compression volume is displaced from the compression volume when the piston moves at least partially through a compression stroke, and/or at least a portion of the hydraulic fluid contained in the extension volume is displaced from the extension volume when the piston moves at least partially through an extension stroke. A hydraulic bump stop that at least temporarily traps a quantity of fluid on a side of the piston that is in the direction of motion. The bump stop may include a valve that allows the quantity of fluid to escape when the pressure reaches a predetermine threshold pressure. In some embodiments, a hydraulic bump stop may include a sealing device, such as for example a disk or a plug, that acts on a surface or device in the actuator to temporarily trap a quantity of fluid adjacent to a piston face that is in the direction of motion of the piston. Once the fluid is trapped, further motion of the piston in the same direction increases the pressure of the trapped quantity of fluid and resists the motion of the piston. The pressure of the trapped quantity of fluid may be regulated or relieved by allowing at least some of the trapped fluid to escape through a valve such as a blow-off valve.

U.S. patent application Ser. No. 14/602,463, entitled "ACTIVE VEHICLE SUSPENSION SYSTEM," which describes the operation of a diverter valve that is included in the housing of an actuator, is incorporated herein by reference in its entirety. U.S. Pat. No. 8,839,920, entitled "HYDRAULIC ENERGY TRANSFER," which describes a shock absorber that may be used to apply active or resistive force, is incorporated herein by reference in its entirety. U.S. Pat. Nos. 8,376,100; 8,392,030; and 8,841,786; each of which is hereby incorporated by reference herein in its entirety, disclose various other aspects of active suspension systems.

Paragraphs [1637]-[1824] of U.S. patent application Ser. No. 14/602,463, entitled "ACTIVE VEHICLE SUSPENSION SYSTEM," describe the operation of an embodiment of a diverter valve and how the pressure forces are balanced so that the movement of the spool is primarily in response to the velocity or volume flow rate of the fluid passing through the valve. Diverter valves are typically activated by flow in a single direction.

It should be appreciated that the foregoing concepts, and additional concepts discussed below, may be arranged in any suitable combination, as the present disclosure is not limited in this respect. It should be further understood, however, that the invention(s) are not limited to the precise arrangements, variants, structures, features, embodiments, aspects, methods, advantages, improvements, and instrumentalities shown and/or described and may be used singularly in the system or method or may be used in combination with other arrangements, variants, structures, features, embodiments, aspects, methods, advantages, improvements, and instrumentalities. Further, other advantages and novel features of the present disclosure will become apparent from the following detailed descriptions of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical, or nearly identical, component that is illustrated in various figures may be represented by a like numeral. For purposes of clarity, not every component may be labeled in every drawing. In the drawings.

DETAILED DESCRIPTION

Figure 1:
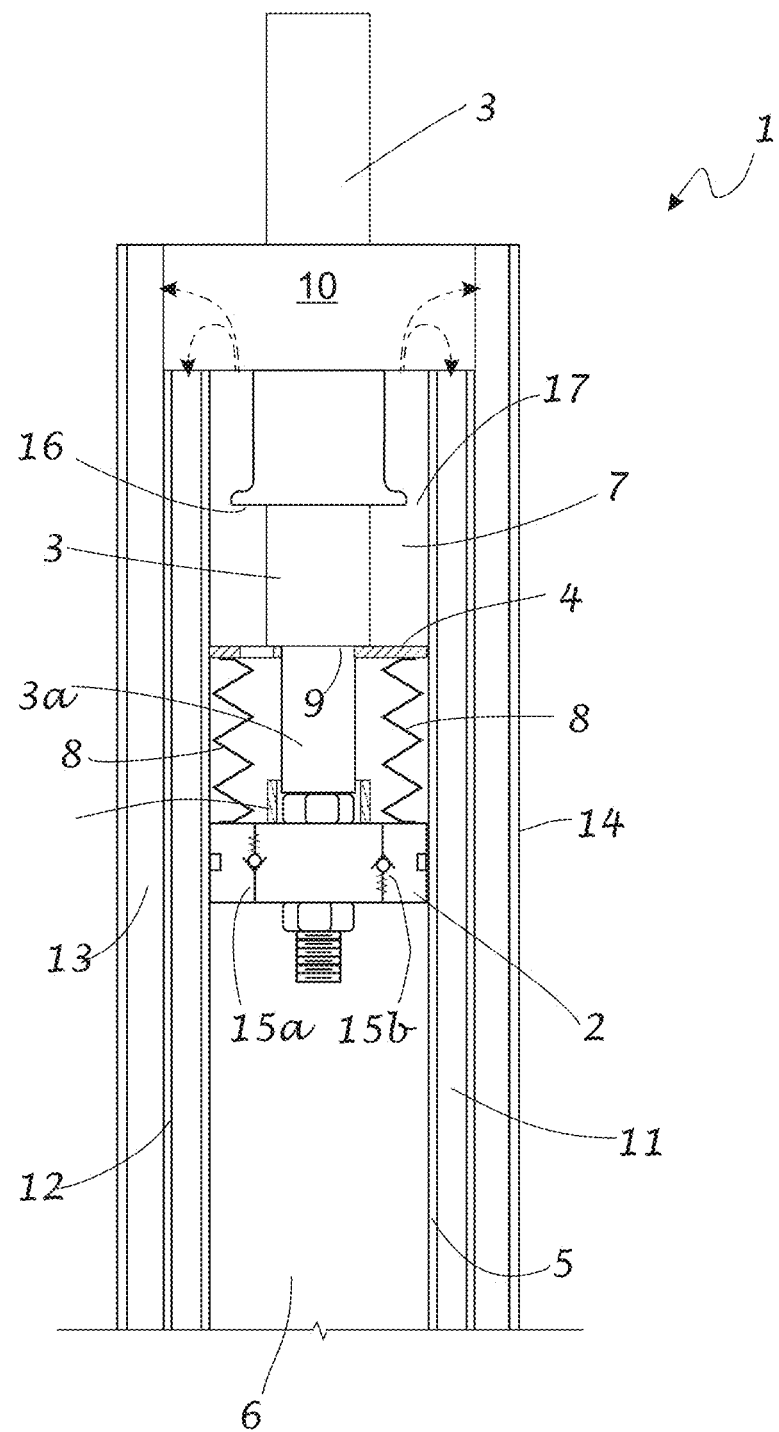
FIG. 1 illustrates an aspect of an embodiment comprising a triple tube damper housing with a piston, piston rod, and a hydraulic bump stop, comprising a slotted sealing disk where the piston is in a normal operating position.

Certain exemplary embodiments will now be described to provide an overall understanding of the principles of the structure, function, manufacture, and use of the system and methods disclosed herein for an actuator system. One or more examples of these embodiments are illustrated in the accompanying drawings and described herein. Those of ordinary skill in the art will understand that the systems, methods, and examples described herein and illustrated in the accompanying drawings are non-limiting exemplary embodiments and that the scope of the present invention is defined solely by the claims. The features illustrated or described in connection with one exemplary embodiment may be combined with features of other embodiments and the features may be used individually, singularly, and/or in various combinations. Such modifications are intended to be included within the scope of the present invention.

According to one aspect, a suspension system shock absorber, damper, or actuator includes a housing which is separated into a compression volume and an extension volume by a piston. In a first mode, the piston moves through at least a portion of a compression stroke, while in a second mode, the piston moves at least partially through an extension stroke. One or more hydraulic bump stops may be used to apply a resistive force on the piston, at one or both extremes of the piston stroke, to rapidly slow the motion of the piston after a certain point in its stroke. Hydraulic bump stops may be engaged as an alternative to or in addition to conventional bump stops.

As used herein, the term "extension volume" refers to the volume available for hydraulic fluid in the housing of a damper or actuator, on the same side of the piston as the piston rod. As used herein, the term "compression volume" refers to the volume available for hydraulic fluid in the housing of a damper or actuator, on the opposite side of the piston from the piston rod.

Hydraulic bump stops are established by causing the motion of the piston to trap a quantity of fluid in a manner that resists the further motion of the piston in a given direction. The trapped fluid is allowed to escape through one or more restrictions, such that the pressure of the trapped fluid increases sufficiently to resist the motion of the piston.

Aspects of some embodiments relate to a diverter valve which is a device that may be used to prevent overspinning of a hydraulic motor/pump in a hydraulic circuit, such as for example, the hydraulic circuit of an active suspension actuator. A diverter valve is a multi-path fluid flow control valve for a shock absorber or other hydraulic circuit that restricts fluid flow to a first path while directing fluid flow to a second path when a preset fluid flow velocity is reached in the first path.

Diverter valves in a hydraulic system typically include at least one fluid flow path through which fluid flows during operation. Embodiments of a spool type diverter valves include at least one spool that is biased in a closed position by a spring or other similar device that applies a bias force. When the flow rate of fluid through the diverter valve increases during operation of the hydraulic system at least one spool converts at least a portion of the kinetic energy of the fluid, impinging on at least one surface of the spool, into static pressure. The balance of the fluid pressure that acts on all the surfaces of the spool is altered in a manner that produces a net force on the spool that opposes the spring that holds the spool in a closed position. When the flow rate surpasses an opening threshold flow rate the net force due to the increased static pressure over comes the bias force and fully or partially activates the spool. The fully or partially activated spool moves in a manner that at least partially opens at least one other flow path for fluid flow through the diverter valve. When the fluid flow rate drops below a closing threshold value, the total static pressure applied to the spool drops and the bias force causes the diverter valve to move towards a more closed or to fully closed position. The opening threshold flow rate may be equal to or different from the closing threshold flow rate.

Applications include active suspension dampers, where diverter valves are used to limit the maximum RPM of a hydraulic motor/pump in the circuit. For such a system, in one mode the diverter valve may allow the entirety of the fluid flow from the first path to move into the hydraulic motor. When the velocity of the fluid flow reaches a tunable set point in a second mode, the diverter valve restricts flow to the hydraulic motor and allows a portion of the flow to bypass the hydraulic motor. In some cases, one or more progressive damping valves are utilized in series or in parallel to smooth damping characteristics during, before, and after transitions.

In one embodiment, a single diverter valve is activated by flow in at least two directions. An embodiment of such a diverter valve is a dual-spool bi-directional diverter valve (DSDV), which is an integrated, dual action (bi-directional) diverter valve comprising a dual-spool design that can function as a bypass in both compression and extension strokes where overspinning of the hydraulic motor/pump would otherwise occur. Typically, two separate diverter valves would be used to prevent overspinning of the hydraulic motor/pump in each stroke direction, i.e. compression and extension. This single dual-spool diverter occupies less space and for example allows for less dead-length in the damper because it combines the functionality of both a compression diverter valve and an extension diverter valve into a single unit. Reducing dead-length in the damper increases the axial range of motion of the shock absorber system, allowing for higher system effectiveness and durability in encountering deep depressions, such as for example, a deep pothole, or high elevations, such as for example, a large speed bump or curb.

Another embodiment of a bi-directional diverter valve that may be activated by flow in at least two directions is a single-spool bi-directional diverter valve (SSDV). The single-spool diverter valve is an integrated, bi-directional diverter valve that includes a single moveable sealing element that may be activated by flow during compression and/or extension strokes where overspinning of the hydraulic motor/pump would otherwise occur. This design includes a single moveable sealing spool that can be induced to move by flow in either of two directions.

The DSDV and SSDV embodiments reduce the mechanical complexity and size of the shock absorber by combining the functionality of two single directional diverter assemblies, where one functions only in compression and a second functions only in extension, into one hydro-mechanical device. Using one device for both compression and extension also reduces material, manufacturing and assembly costs. Typically an SSDV would have an even lower parts count and would be easier to assemble and be more durable than a DSDV.

Turning now to the figures, several nonlimiting embodiments are described in more detail. Further, it should be understood that the various features, components, systems, and methods described in regards to the figures may be combined in any appropriate manner as the disclosure is not so limited.

In the embodiments described below, a triple tube damper is used. However, it should be understood that the various embodiments described herein may be used with other dampers as well including single and double tube dampers as the disclosure is not so limited.

FIG. 1 illustrates an aspect of an embodiment of a triple tube damper housing 1 with a piston 2, piston rod 3, and a hydraulic bump stop with a slotted sealing disk 4. A hydraulic bump stop is an arrangement components that act in concert to increase hydraulic pressure applied to the piston that resists its motion when it has reached a predetermined point in its stroke. In FIG. 1, the piston is shown in a mid-stroke operating position in the pressure tube 5. The piston 2 is attached to the neck 3a of rod 3 and divides the volume within pressure tube 5 into a compression volume 6 and an extension volume 7. Slotted sealing disk 4 is attached to piston 2 by an intervening compressible member 8. The slotted sealing disk 4 is biased against annular shoulder 9 formed between rod 3 and neck 3a by a force exerted by compressible member 8. The outside diameter of the sealing disk 4 has a small diametrical clearance with the bore of the pressure tube 5. The small diametrical clearance permits a significant pressure buildup across the sealing disk when it is seated without the sealing disk coming into contact with the bore of the pressure tube 5. In embodiments, the small diametrical clearance may be in the range of 0.002 inches to 0.02 inches. In the embodiment in FIG. 1, during normal operation when the piston moves at least partially through an extension stroke, fluid may flow out of the extension volume and be directed by diverter valve 10 (shown without detail) to annular channel 11 formed by pressure tube 5 and middle tube 12. Alternatively, fluid may be directed by valve 10 into annular channel 13 formed between the middle tube 12 and outer tube 14. Fluid may also be directed into both channels simultaneously. A compressible member 8 may be, for example, a cylindrical coil spring, a conical coil spring, a wave spring, or an elastomeric spring. In some embodiments, there may be free flow of fluid across the compressible member in the radial and/or axial direction and the fully compressed height of the compressible member may be minimized.

Blow-off valves (BOVs) 15a and 15b are configured and sized to limit peak pressures in the compression volume 6 and extension volume 7, respectively, during operation. Peak pressure may be caused by, for example, excessive piston speed and/or acceleration. The BOVs limit pressure by allowing fluid to flow directly from the high-pressure side of the piston to the low-pressure side when a high pressure threshold has been reached or surpassed. In some embodiments, the BOVs may be incorporated in the piston structure and are passive pressure actuated valves although active valves may also be used.

Figure 2:
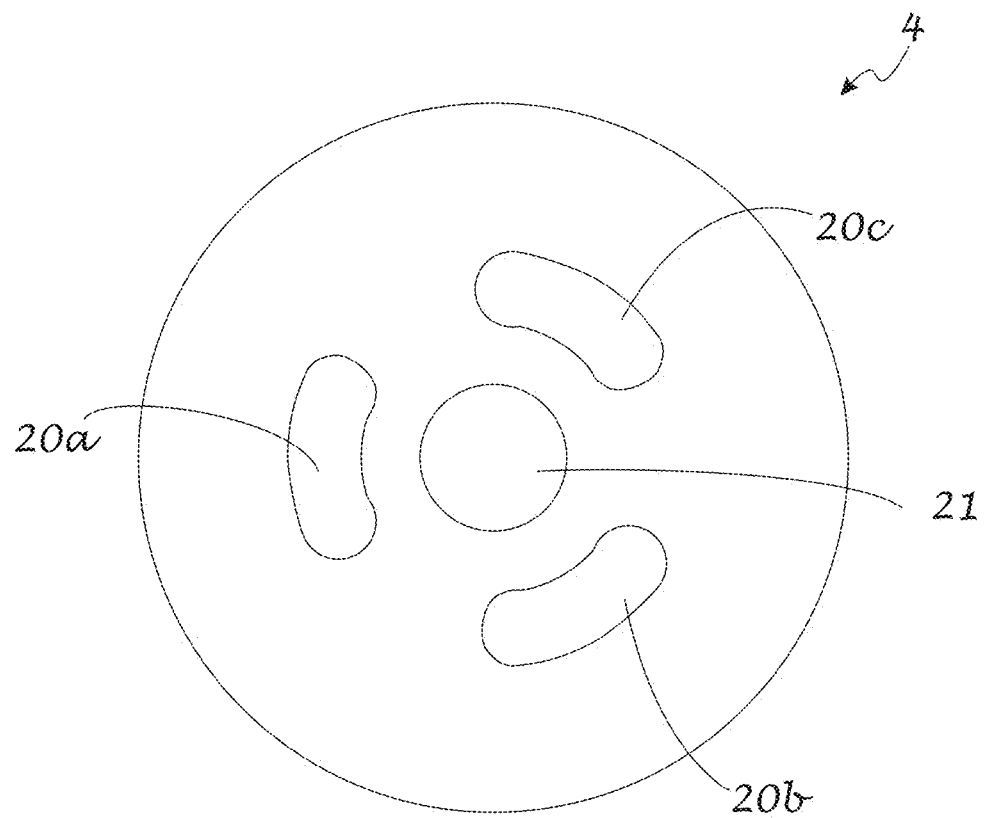
FIG. 2 depicts an illustration of the slotted sealing disk.

FIG. 2 depicts a top view of the slotted sealing disk 4 shown in FIG. 1. While any shape slot or opening may be used in the sealing disk, in one embodiment, one or more slots formed in the sealing disk are arcuate slots 20a, 20b, and 20c which are configured and sized to allow fluid to flow freely from BOV 15a to BOV 15b when those valves are open because of an overpressure event when the piston is at any point in its normal operating stroke. Normal operating stroke of the piston is defined as the portion of the extension and/or compression stroke prior to a bump stop being engaged. In some embodiments, when the BOVs are open and the piston is moving through its normal operating stroke, flow through slots 20a-20c does not cause a pressure drop in excess of 50 psi. In some embodiments, pressure drop is not in excess of 30 psi, while in other embodiments it is not in excess of 10 psi. Opening 21 is configured and sized to slideably receive neck 3a of rod 3 shown in FIG. 1.

Figure 3:
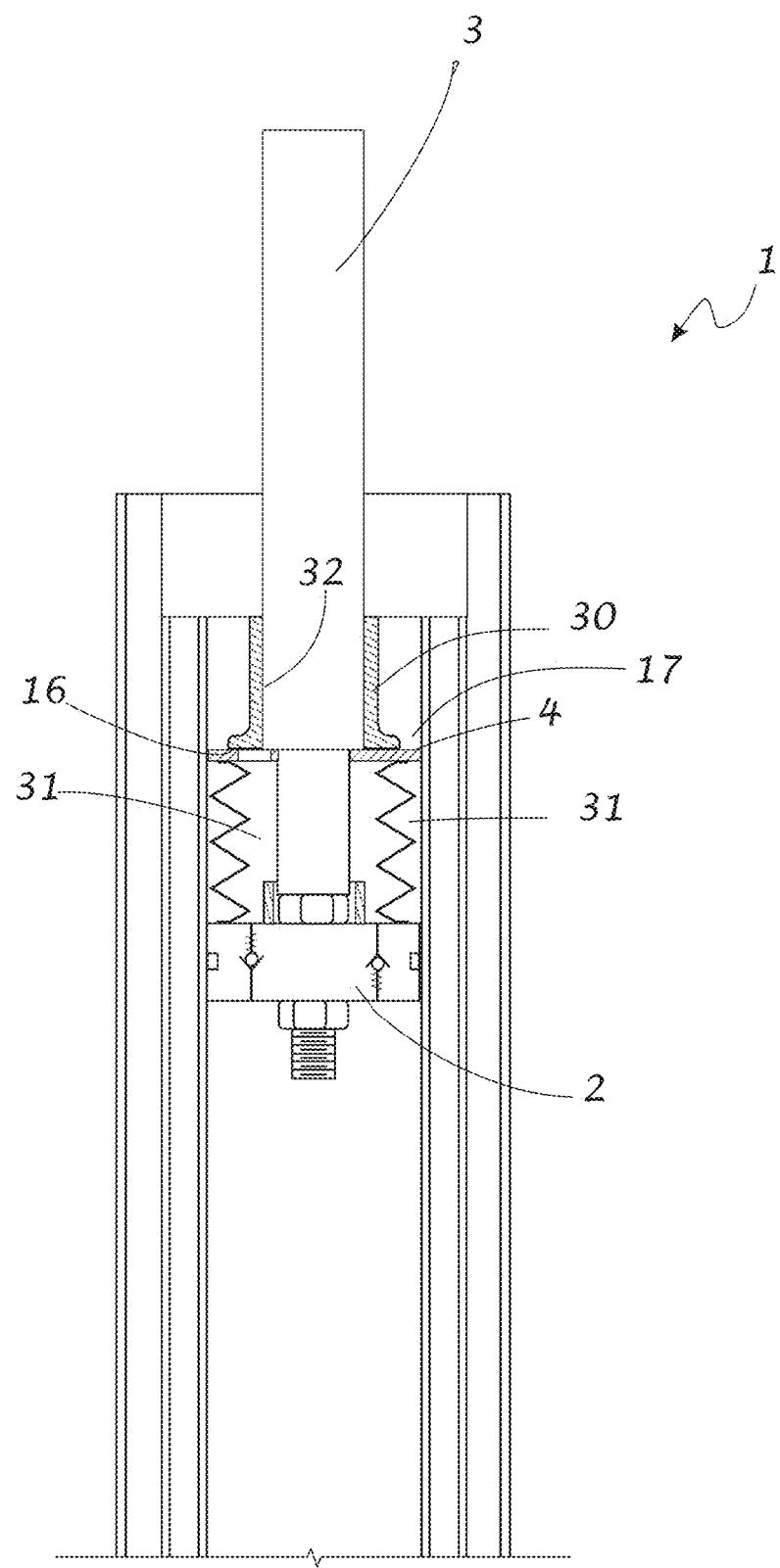
FIG. 3 depicts the embodiment of FIG. 1 with the slotted sealing disk in a sealing position.

FIG. 3 depicts the embodiment shown in FIG. 1 with the piston at the maximum extension point of its stroke during normal operation. At this maximum normal extension, slotted sealing disk 4 is engaged by a sealing surface 16 which in this case is a radially outwardly extending annular surface of annular stationary mechanical stop 30. Once disk 4 is engaged by surface 16, the surface blocks slots 20a-20c. Further, the disk and annular passage 17 are sized such that fluid flow between the intervening volume 31 located between the back face of the piston and disk 4, is substantially trapped, i.e. the fluid is prevented from flowing from the intervening volume to the annular passage and the diverter valve. Cylindrical opening 32 in mechanical stop 30 slideably receives rod 3.

Figure 4:
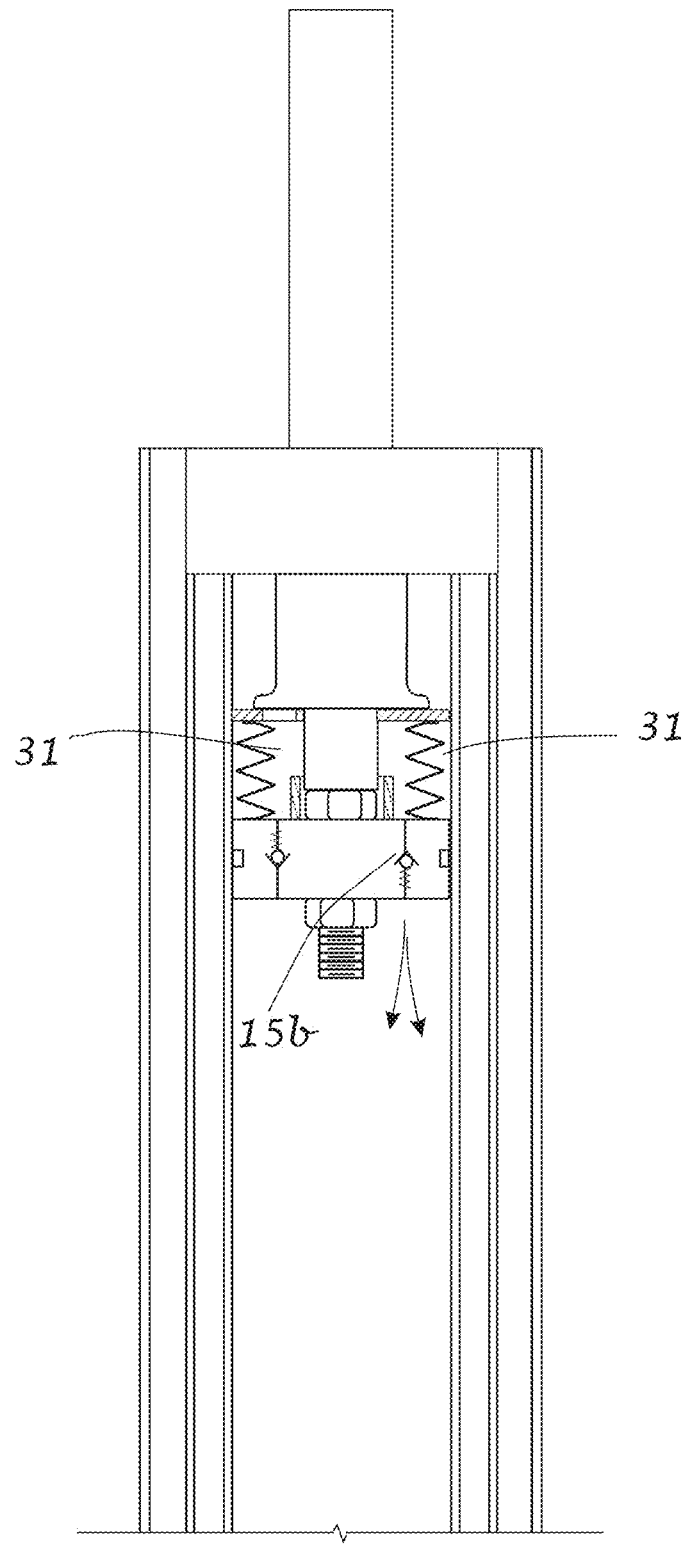
FIG. 4 depicts the embodiment of FIG. 1 with the piston in a position where the hydraulic stop is engaged.

FIG. 4 depicts the embodiment shown in FIG. 1 where the piston has moved beyond the point where the fluid in volume 31 is initially trapped. This continued movement of the piston relative to the now sealed and stationary sealing disk 4 causes the pressure in the intervening claim 31 located between the piston and the sealing disk to increase, thus resisting the motion of the piston. This volume of isolated hydraulic fluid with an increased pressure relative to hydraulic fluid located on the other side of the piston then functions as a hydraulic bump stop that resists further movement of the piston. In some embodiments, once the pressure increases sufficiently, it causes the BOV 15b to open allowing some of the fluid trapped in volume 31 to escape to the compression volume. In the embodiment shown in FIG. 1-5, at least the piston 2, the compressible member 8, the BOV 15b, the slotted disk 4, and the annular stationary mechanical stop 30 work in concert to form a hydraulic bump stop.

Figure 5:
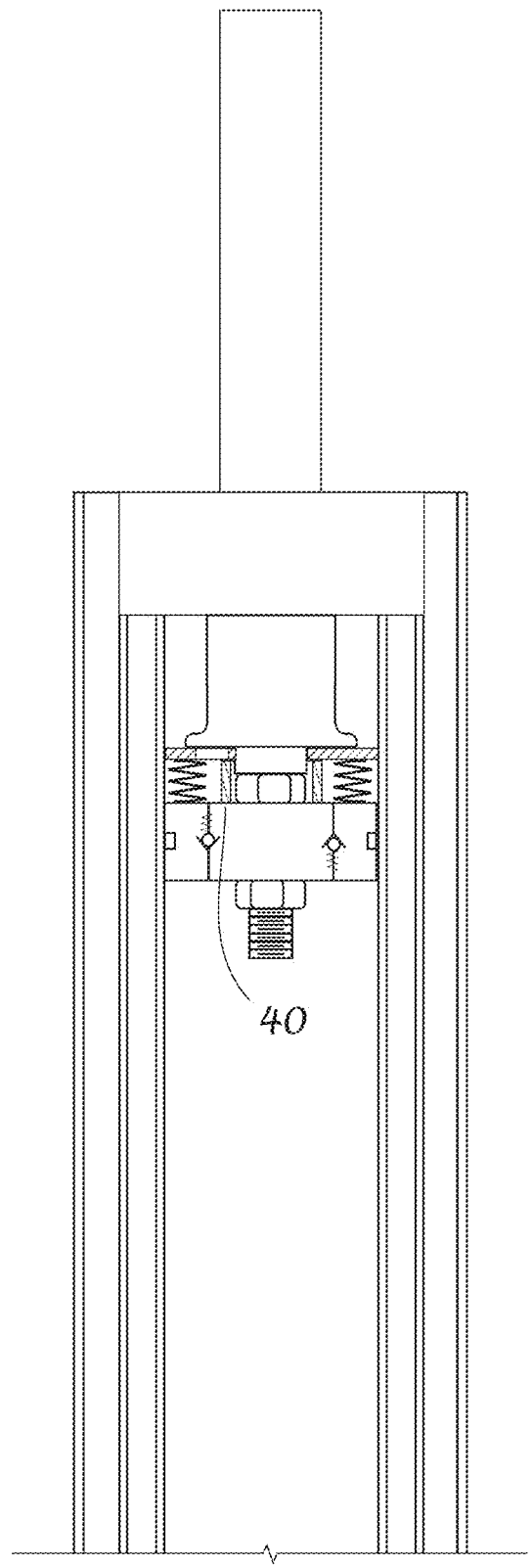
FIG. 5 depicts the embodiment of FIG. 1 with the stationary mechanical stop engaged.

In some embodiments, it may be desirable to combine a hydraulic bump stop with other mechanisms for limiting movement of a piston. For example, in one embodiment, as depicted in FIG. 5, the motion of a piston is further slowed and/or stopped by using a moving mechanical stop 40 attached to or adjacent to the back face of the piston in conjunction with the pressure applied to the back face of the piston by the hydraulic bump stop.

Figure 6:
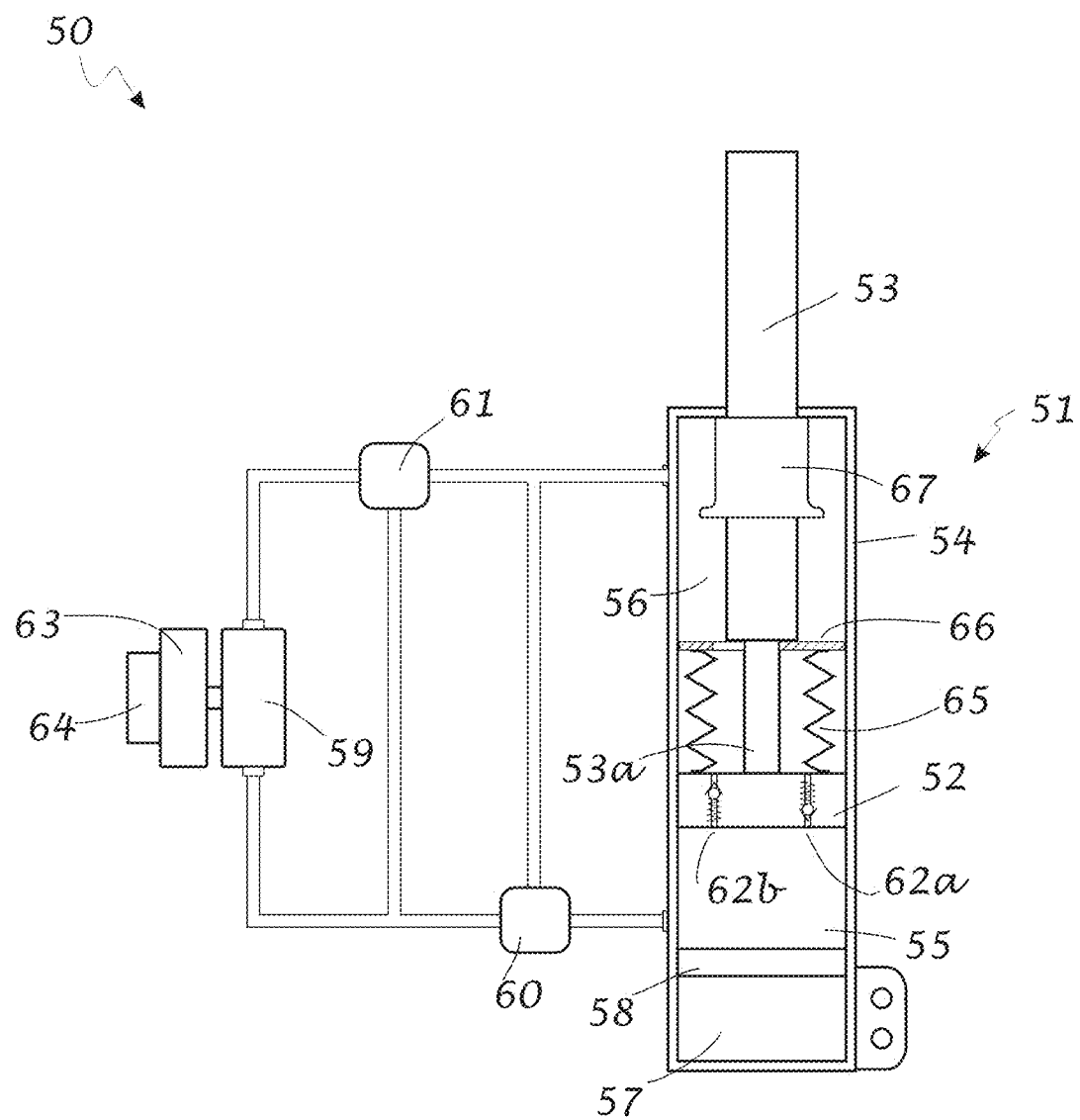
FIG. 6 illustrates an aspect of a hydraulic active suspension system with a monotube actuator housing.

FIG. 6 illustrates an aspect of an embodiment of a hydraulic circuit of an active suspension system 50 comprising an actuator 51 which includes a piston 52 with a piston rod 53. The piston 52 is slideably received in actuator housing 54 and divides its internal volume into compression volume 55 and extension volume 56. Piston 52 is attached to neck 53a of rod 53. The compression volume is reduced when the piston rod is moved further into the housing, while the extension volume is reduced when the piston rod is moved out of the housing. In some embodiments, accumulator (reservoir) 57 is incorporated in actuator housing 54 and separated from compression volume 55 by floating piston 58. An additional or alternative accumulator may be incorporated in the upper portion of actuator housing 54 and may be separated from extension volume 56 by an annular floating piston (not shown). An accumulator may also be located external to the actuator housing 54 and configured to be in fluid communication with the compression volume or the extension volume.

The hydraulic circuit of an active suspension system 50 further includes a hydraulic motor/pump (HMP) 59. In some embodiments, the HMP is a positive displacement device so that the piston 52 and the HMP may move substantially in lockstep with each other. Without wishing to be bound by theory, in such an arrangement, the movement of the actuator piston 52 can be controlled more effectively in both absorbing and driving modes. Therefore, while embodiments below are described relative to a HMP, the embodiments may be used with a pump, or hydraulic motor, where appropriate as the disclosure is not so limited.

FIG. 6 illustrates the use of bypass valves to prevent damage to the HMP due to overspeeding. For example, if the actuator 51 is being compressed at an excessive rate, at least a portion of the fluid flowing out of the compression volume 55 may be bypassed so that it flows directly into the extension volume 56 without passing through the HMP. Fluid flowing out of the compression volume may be partially or completely diverted by the bypass valve 60. Fluid flowing out of the extension volume may be partially or completely diverted by bypass valve 61. In some embodiments, bypass valves 60 and 61 are passive diverter valves that are self-actuated when the velocities of fluid leaving the housing 54 exceeds a threshold value. In FIG. 6, the bypass valves are shown to be external to actuator housing 54. In some embodiments, one or both of these valves may be integrated with the actuator housing.

Blow-off valve 62a may be used to limit the maximum pressure in the compression volume 55, while blow-off valve 62b may be used to limit the maximum pressure in the extension volume 56. For example, the blow-off valves may open when a pressure applied to a corresponding side of the piston is above a preset threshold pressure. Any convenient blow-off valve may be used including, for example, a spring-loaded check valve or a preloaded shim stack as the disclosure is not so limited.

HMP 59 is operatively coupled with an electric motor/generator 63, which is used to both drive the HMP when it needs to be operated as a pump or to absorb power when the HMP is functioning as a motor. Local electronic controller 64 is used to operate the motor/generator in response to various measurements and the output of internal and/or external sensors.

Compressible member 65, slotted sealing disk 66, and stationary mechanical stop 67 work in conjunction with BOV 62b to trap fluid behind the piston and form a hydraulic bump stop that can be used to slow and/or stop the motion of the piston using hydraulic pressure. A hydraulic bump stop is defined as any mechanism that traps hydraulic fluid in a manner that increases the resistive pressure against a face of the piston of a hydraulic damper, actuator, or shock absorber. In some embodiments, the pressure may be controlled by using at least one BOV in the piston. In some embodiments, the maximum level of pressure may be determined by tuning at least one BOV in the piston. Although, the hydraulic bump stop in FIG. 1 is depicted to be on the extension volume side of the piston, embodiments are not so limited. The moving bump stop elements may be attached to either face of the piston or even be stationary and attached to either end of the pressure tube.

Figure 7:
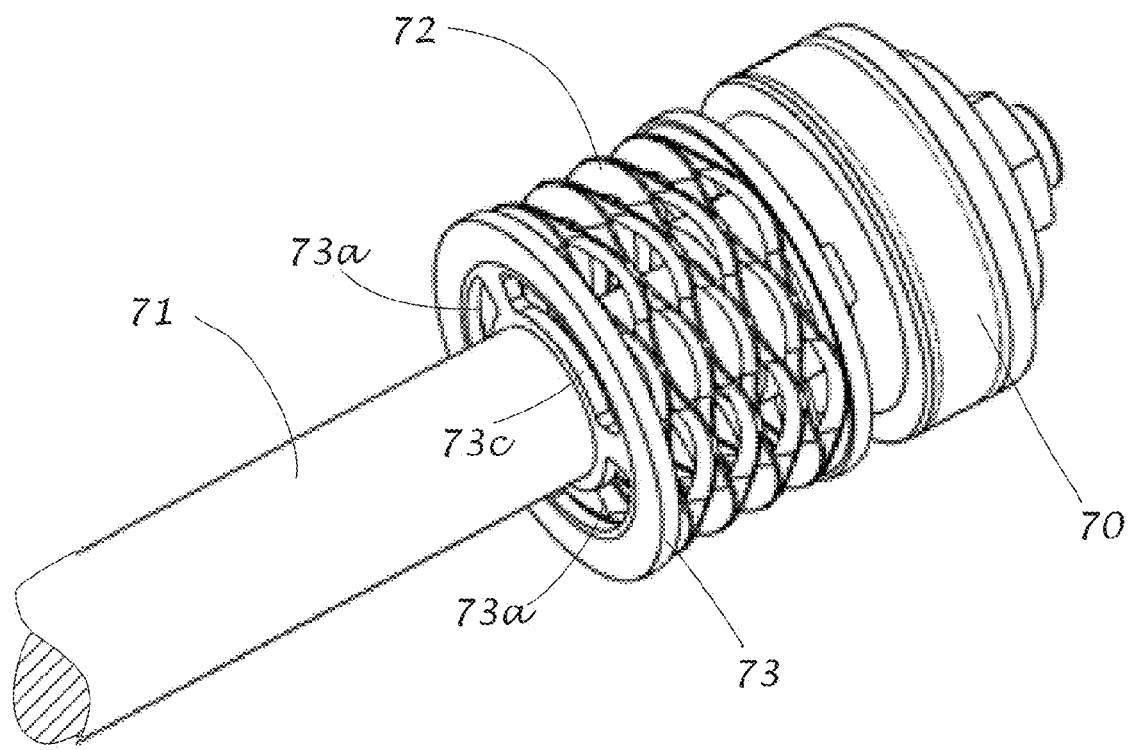
FIG. 7 illustrates an aspect of an embodiment of a piston, piston rod, and slotted disk.

FIG. 7 depicts a perspective view of an embodiment of a hydraulic piston 70 of a hydraulic damper, piston rod 71, wave spring 72, and slotted sealing disk 73, with slots 73a-73b.

Figure 8:
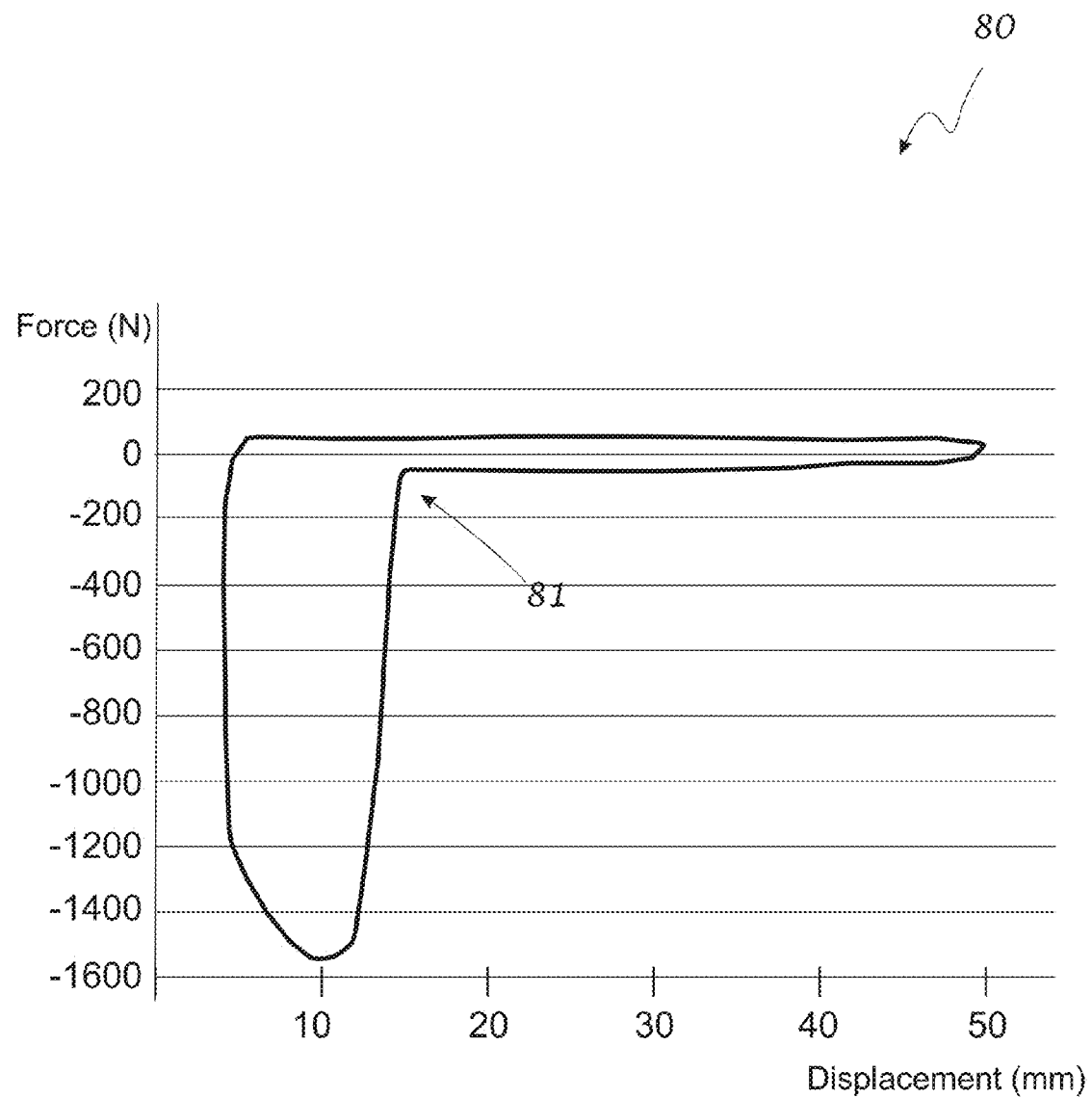
FIG. 8 depicts the relationship between pressure, in the pressure tube of an exemplary damper configured with a hydraulic bump stop, and the displacement of the piston.

FIG. 8 depicts a graph 80 of the relationship between pressure in the pressure tube of an exemplary damper configured with a hydraulic bump stop and the displacement of the piston. The data was collected using a damper with a piston diameter of 36 mm and stroke of 120 mm and the bump stop illustrated in FIG. 1. The test was conducted using a dynamometer that was only able to drive the damper through a stroke of approximately 50 mm. When the slotted sealing ring engages the stationary mechanical stop at point 81, the pressure increases sharply in the negative (i.e. expansion) direction. This sharp rise in pressure may result in undesirable noise, vibration and harshness (NVH) in the vehicle. Although it is a requirement of the hydraulic bump stop to rapidly increase the pressure in the damper to arrest damper motion, it may be desirable to smooth (or round) the transition point when the slotted sealing ring engages the stationary mechanical stop.

The embodiments in FIGS. 9-13 illustrate various configurations for inducing a more gradual increase in the rate of pressure rise when a sealing ring engages a stationary mechanical stop in a hydraulic bump stop.

Figure 9:
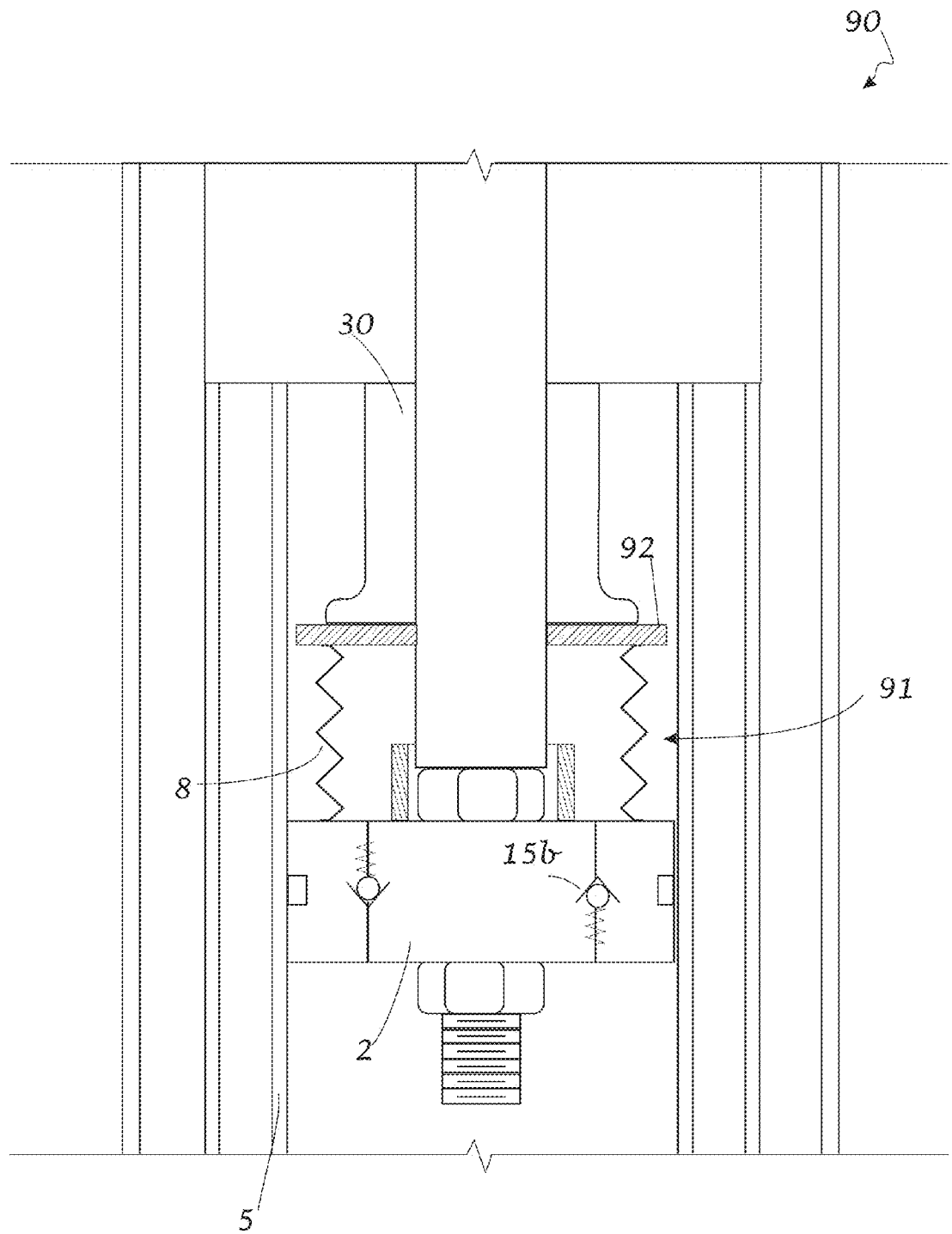
FIG. 9 illustrates another aspect of an embodiment of a damper comprising a piston, a piston rod, and a hydraulic bump stop with an increased leakage path around a seated slotted sealing disk.

FIG. 9 illustrates an aspect of another embodiment of a triple tube damper 90 with a hydraulic bump stop 91, including piston 2, check valve 15b, compressible member 8, and slotted sealing disk 92. The clearance between the outer diameter of disk 92 and bore of pressure tube 5 has been increased, relative to disk 4 depicted in FIG. 1, to allow greater leakage past the disk when mechanical stop 30 is engaged by slotted disk 92. This is in order to reduce the initial rate of increase of pressure when the bump-stop is activated. The increased diametrical clearance in some embodiments may be in the range of 0.02 inches to 0.1 inches.

Figure 10:
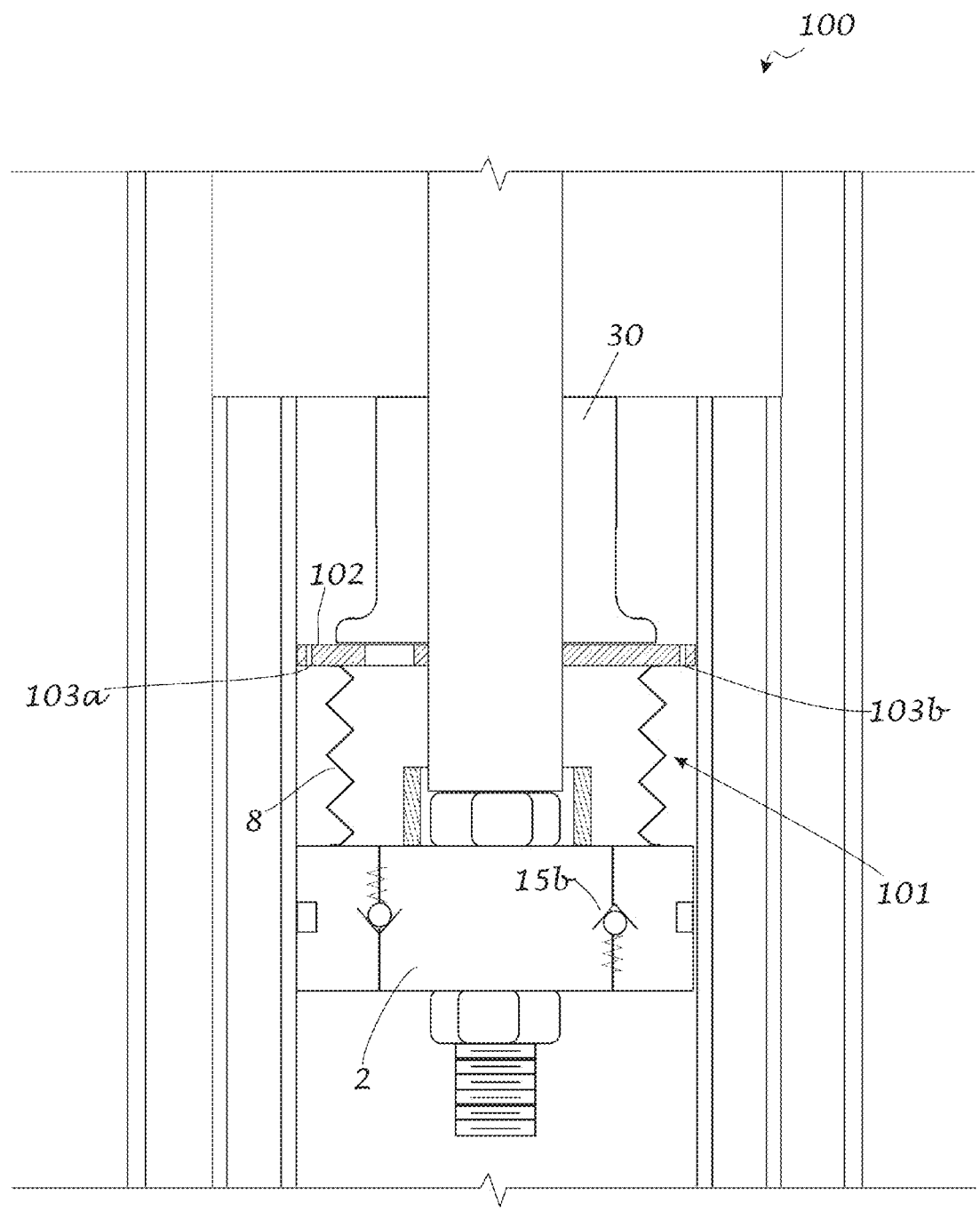
FIG. 10 illustrates another aspect of an embodiment of a damper comprising a piston, a piston rod, and a hydraulic bump stop with orifices in the slotted sealing disk that allow controlled flow past the ring when it is seated.

FIG. 10 illustrates an aspect of a further embodiment of a triple tube damper 100 with hydraulic bump stop 101 including piston 2, check valve 15b, compressible member 8, and slotted sealing disk 102. Flow passages 103a and 103b are arranged at a radial location beyond the corresponding sealing surface of the mechanical stop 30 which allows flow through the disk when mechanical stop 30 is engaged by slotted disk 102. The flow passages 103a and 103b may have any appropriate size or shape, and to selected to limit the initial rate of rise of pressure to a desired value when a bump-stop including such a feature is activated.

Figure 11:
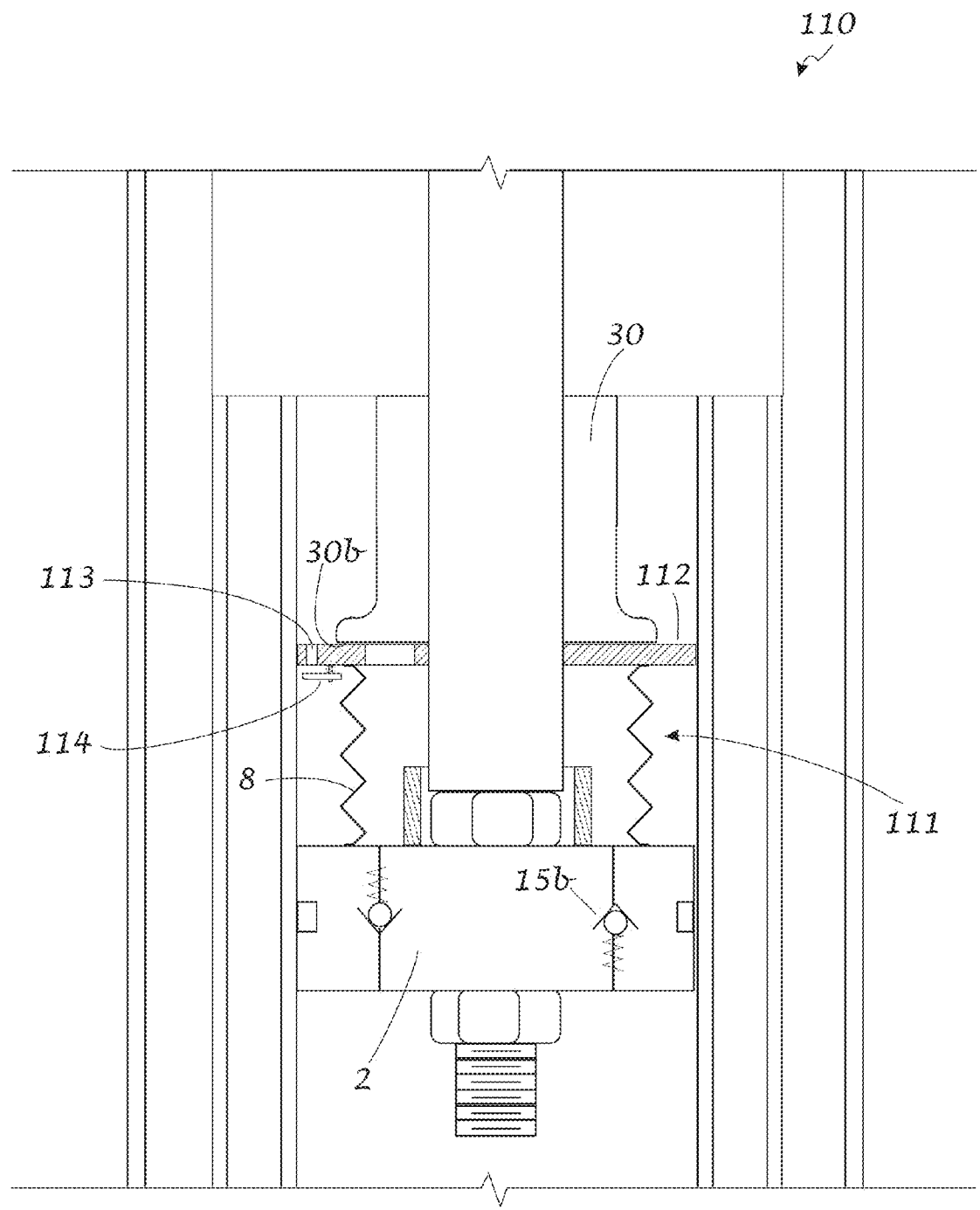
FIG. 11 illustrates another aspect of an embodiment of a damper comprising a piston, a piston rod, and a hydraulic bump stop with a slotted sealing disk that is configured with a variable orifice mechanism in the open position.

FIG. 11 illustrates an aspect of a further embodiment of a triple tube damper 110 with hydraulic bump stop 111 including piston 2, check valve 15b, compressible member 8, and slotted sealing disk 112. Flow passage 113 located outside the sealing surface of mechanical stop 30 allows flow through the disk when mechanical stop 30 is engaged by slotted disk 112. This is in order to reduce the initial rate of increase of pressure when the bump-stop is activated. Spring-loaded check valve mechanism 114 that restricts or totally stops the flow through flow passage 113. Specifically, the spring biases the valve towards the open position, but once the flow through the flow passage exceeds a threshold value, the valve closes. Although a single flow passage 113 is shown in FIG. 11, one or more additional flow passages may be utilized. Spring-loaded check valve mechanisms may be used with these additional flow passages as well. By configuring multiple check valve mechanisms associated with a corresponding plurality of flow passages to activate at different pressures or flow rates, the pressure increase profile behind the bump stop may be finely tuned.

Figure 12:
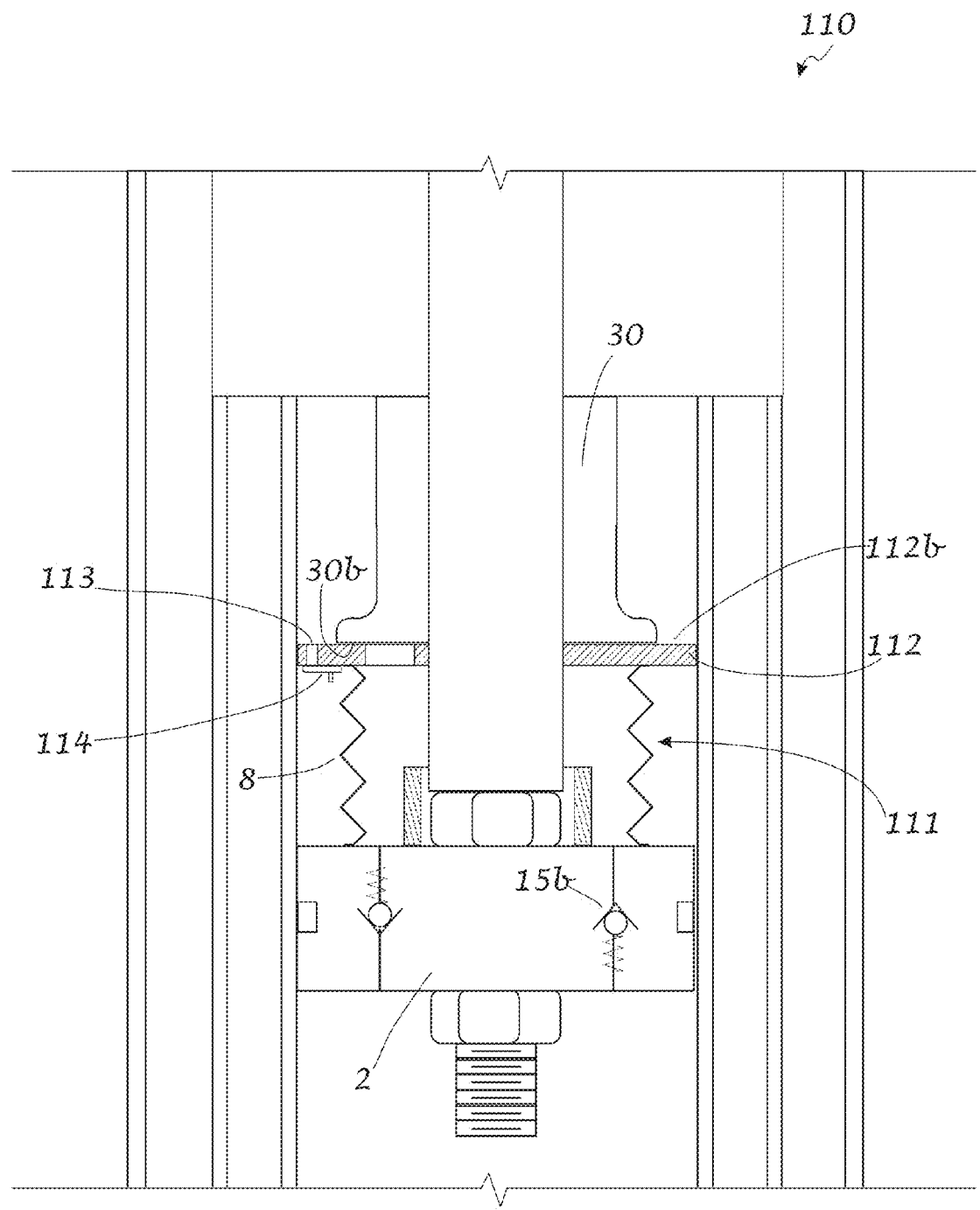
FIG. 12 illustrates the damper of FIG. 11 where the variable orifice mechanism is in the closed position.

FIG. 12 illustrates the triple tube damper 110 of FIG. 11 where a flow passage 113 is blocked by a spring-loaded check valve mechanism 114. If the slotted sealing disk is configured with multiple flow passages, an annular spring-loaded ring (not shown) may be used to block some or all of the flow passages simultaneously. The surface 30b of the mechanical stationary stop 30 that is engaged by the slotted disk, or the surface 112b of the slotted disk 112, or both, may be, at least partially coated or covered by intervening layer(s) of material (not shown) that will cushion the collision of the two elements. Appropriate materials may include, but are not limited to elastomers. The spring-loaded check valve mechanism 114 may be constructed as a separate spring-loaded component, or the check valve may include a flexible disk that will deflect under pressure to restrict or totally block flow through passage(s) 113.

Figure 13:
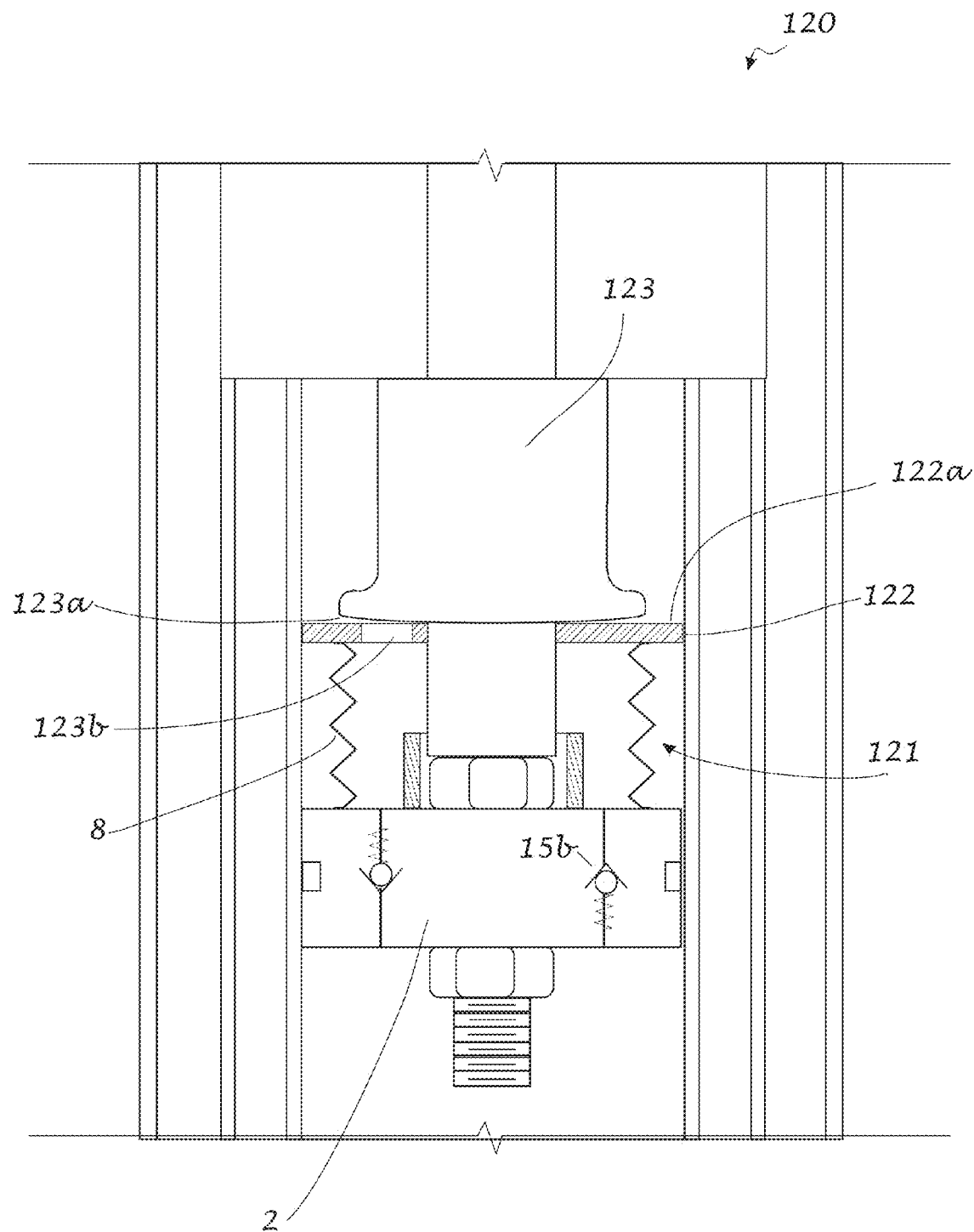
FIG. 13 illustrates another aspect of an embodiment of a damper comprising a piston, a piston rod, a progressive hydraulic bump stop, and a mechanical bump stop with a sloping radial surface for engaging the slotted sealing disk.
Figure 14:
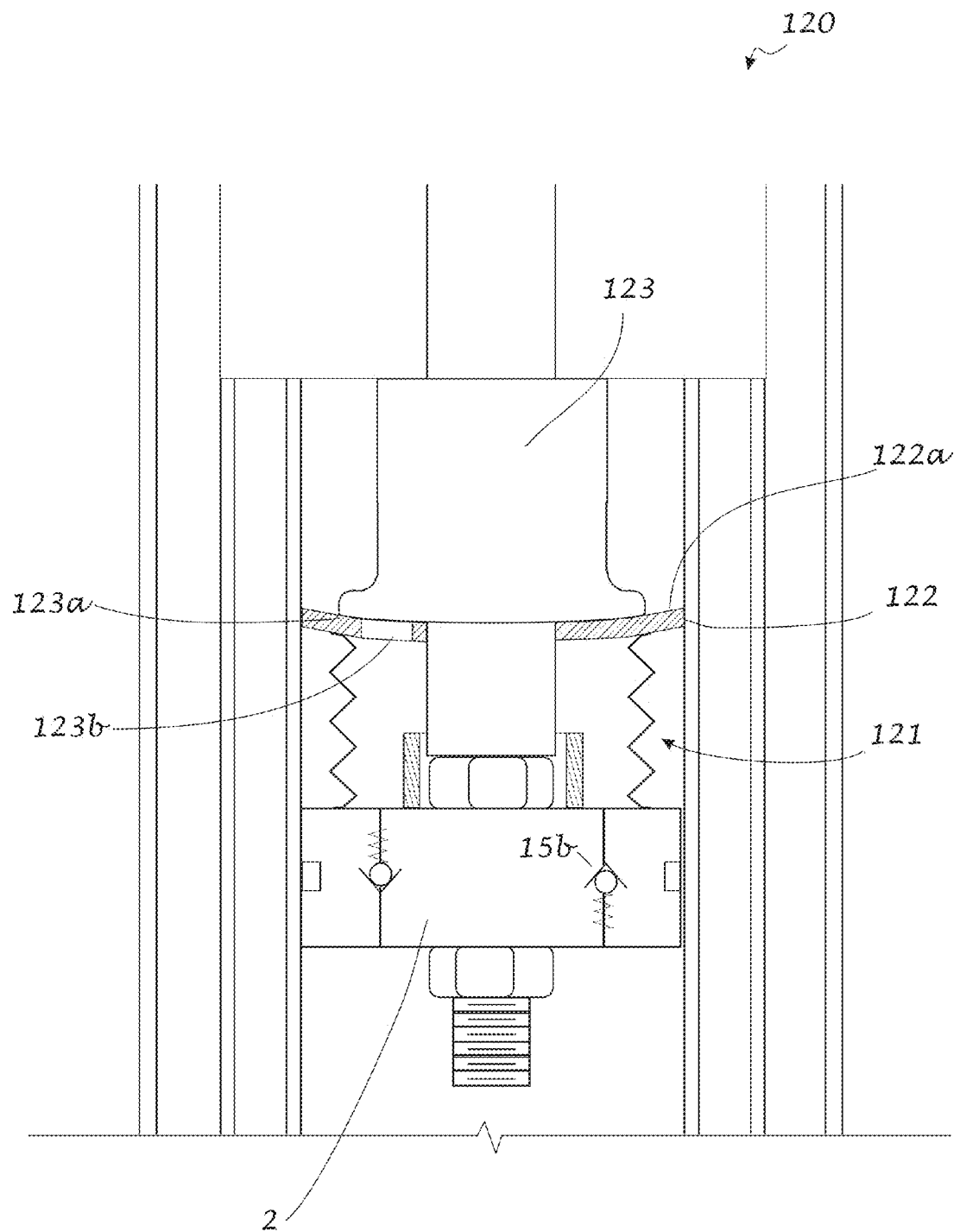
FIG. 14 illustrates damper of FIG. 13 where the sloping radial surface has fully engaged the slotted sealing disk.

FIG. 13 illustrates an aspect of a further embodiment of a triple tube damper 120 with a hydraulic bump stop 121, including piston 2, BOV 15*b*, compressible member 8, and slotted sealing disk 122. The stationary mechanical stop 123 is configured with a radially sloping surface 123*a*. When the stationary mechanical stop 123 first engages the slotted disk 122, the one or more slots 123*b* (only one slot is shown) are not fully blocked by the sloping surface 123*a* and limited flow continues to leak through the slotted disk. This leakage flow limits that rate of pressure rise in the hydraulic bump stop. As illustrated in FIG. 14, as the pressure in the bump stop climbs, the slotted disk 122 is deformed such that surface 122*a* more closely conforms to surface 123*a*. With increasing deformation, the slot(s) 123*b* are increasingly blocked thus more fully sealing the remaining fluid in the hydraulic bump stop.

Figure 15:
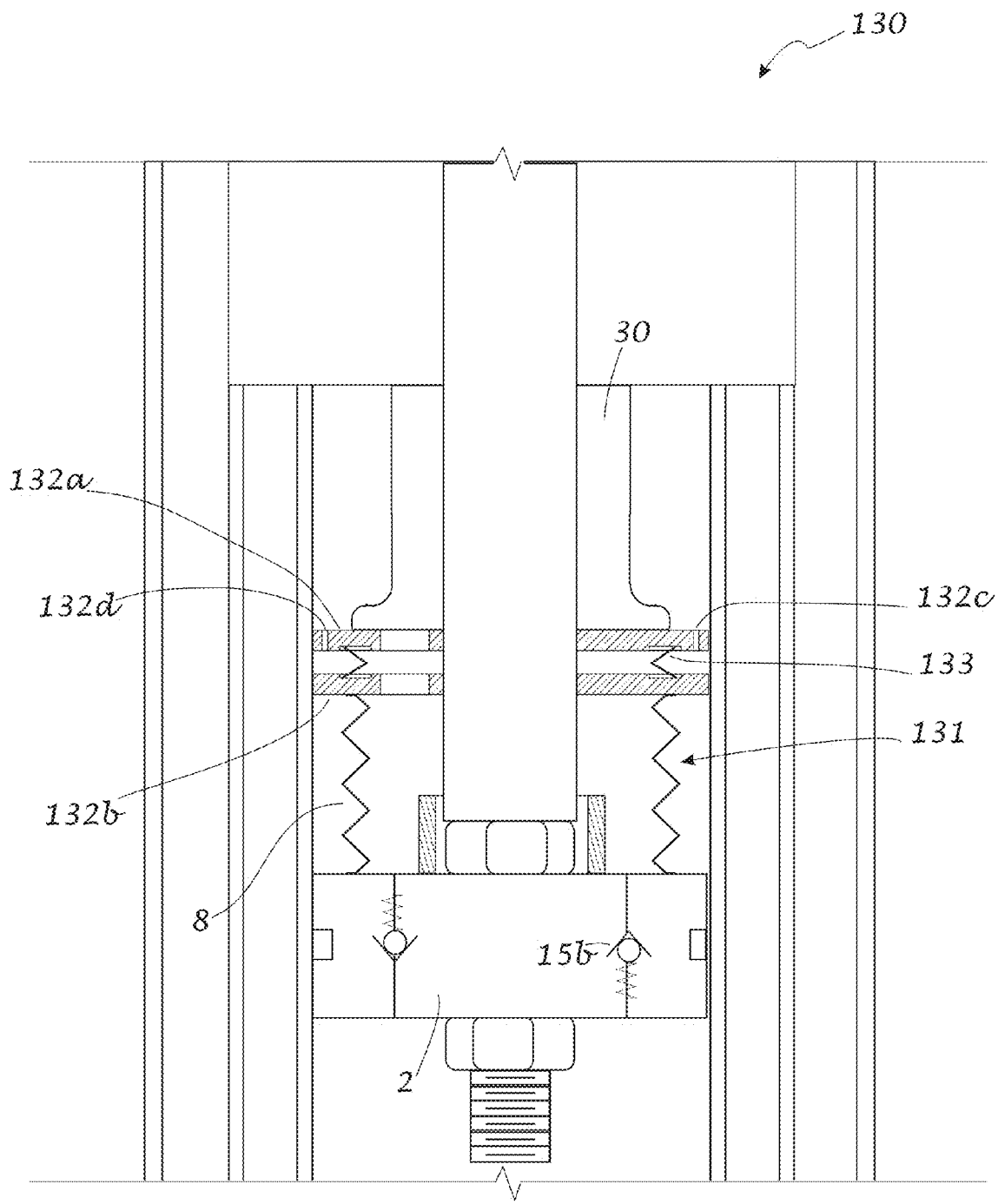
FIG. 15 illustrates another aspect of an embodiment of a damper comprising a piston, a piston rod, and a hydraulic bump stop with a tandem slotted sealing disk.
Figure 16:
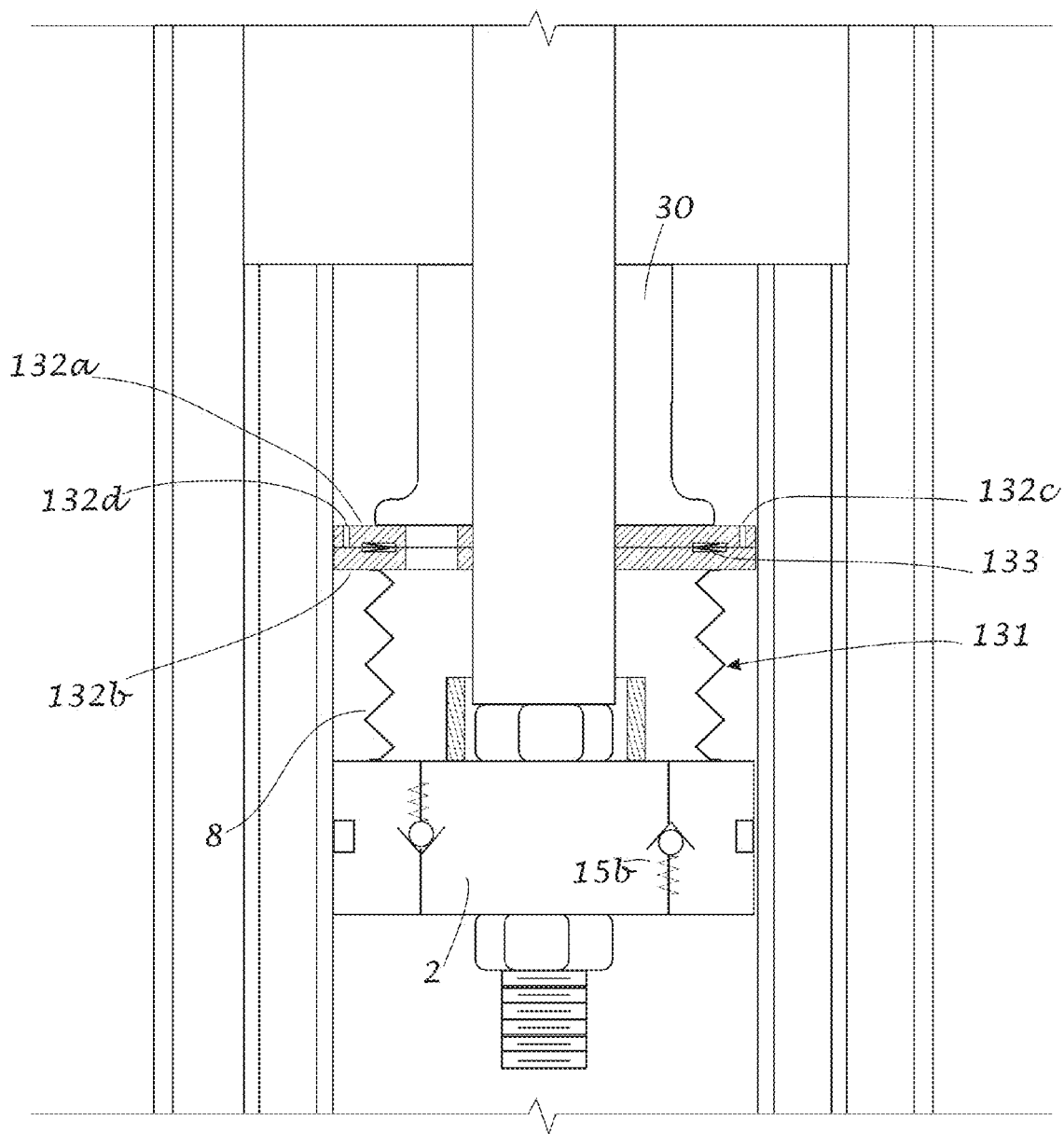
FIG. 16 illustrates the damper of FIG. 15 comprising a tandem slotted sealing disk in a collapsed position.

FIG. 15 illustrates an aspect of still another embodiment of a triple tube damper 130 with a hydraulic bump stop 131 including piston 2, BOV 15*b*, compressible member 8, and tandem slotted sealing disk. When the leading disk 132*a* is engaged by stationary mechanical stop 30, the slot(s) in disk 132*a* are blocked but the increase of pressure in the bump stop is limited by bypass paths 132*c* and 132*d*. If the motion of the piston continues, the intervening compressible element 133 between tandem disks is compressed. When the compressible element 133 is fully compressed, tandem disks come together and are in full contact as illustrated in FIG. 16. Consequently, the bypass flow paths 132*c* and 132*d* are blocked by disk 132*b*. The disk 132*b* may be constructed as a separate component and with a compressible element as shown, or the disk 132*b* may be a flexible disk attached to disk 132*b* that will deflect under pressure to restrict or totally block flow through passage(s) 132*c* and 132*d*.

Figure 17:
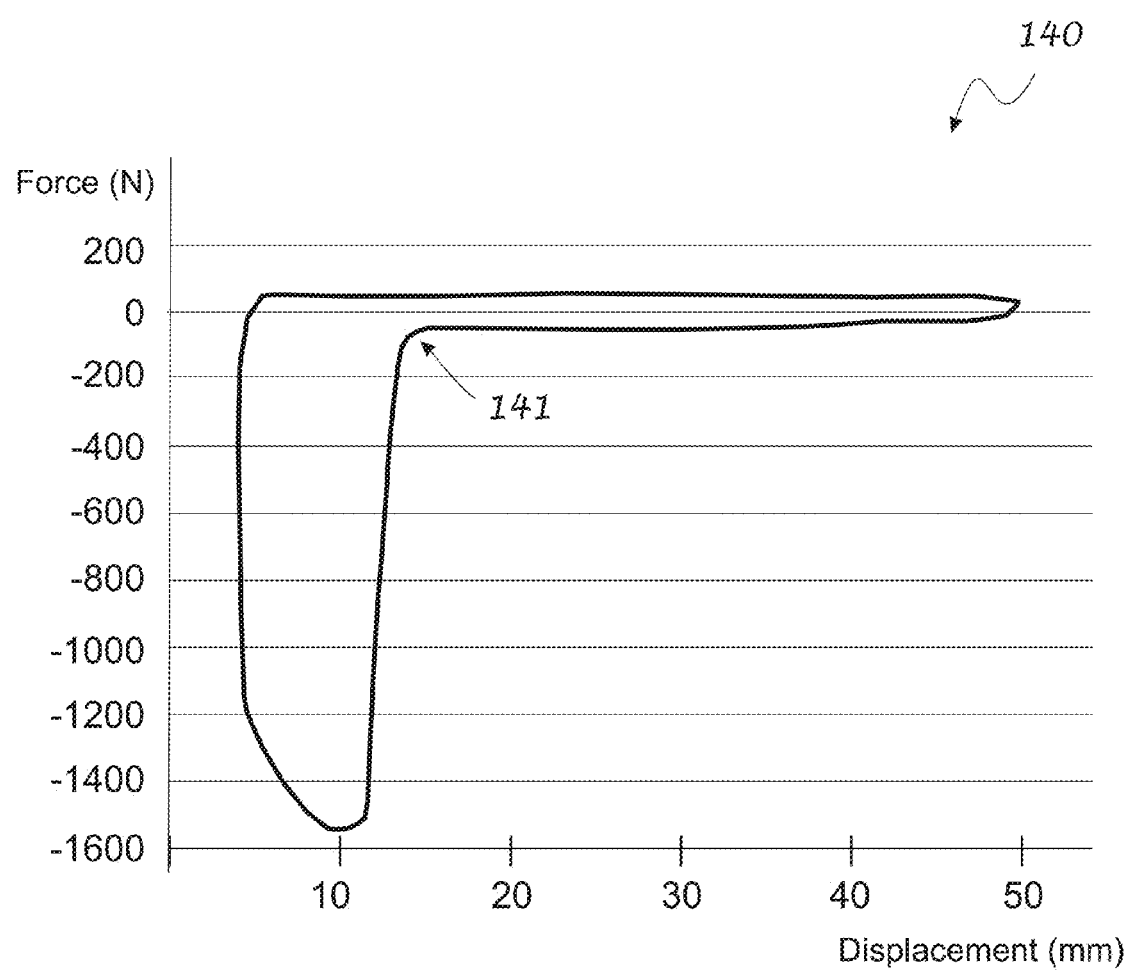
FIG. 17 depicts the relationship between pressure, in the pressure tube of an exemplary damper configured with a hydraulic bump stop, and the displacement of the piston with a gradual pressure transition.

FIG. 17 depicts a graph 140 of the relationship between piston displacement and pressure in the pressure tube of an exemplary damper configured with a hydraulic bump stop with progressive engagement as described above and shown in FIGS. 11-13. At point 141, the rate of pressure increase produced by the hydraulic bump stop is curtailed by using progressive engagement between the slotted disk(s) and the stationary mechanical stop.

Figure 18:
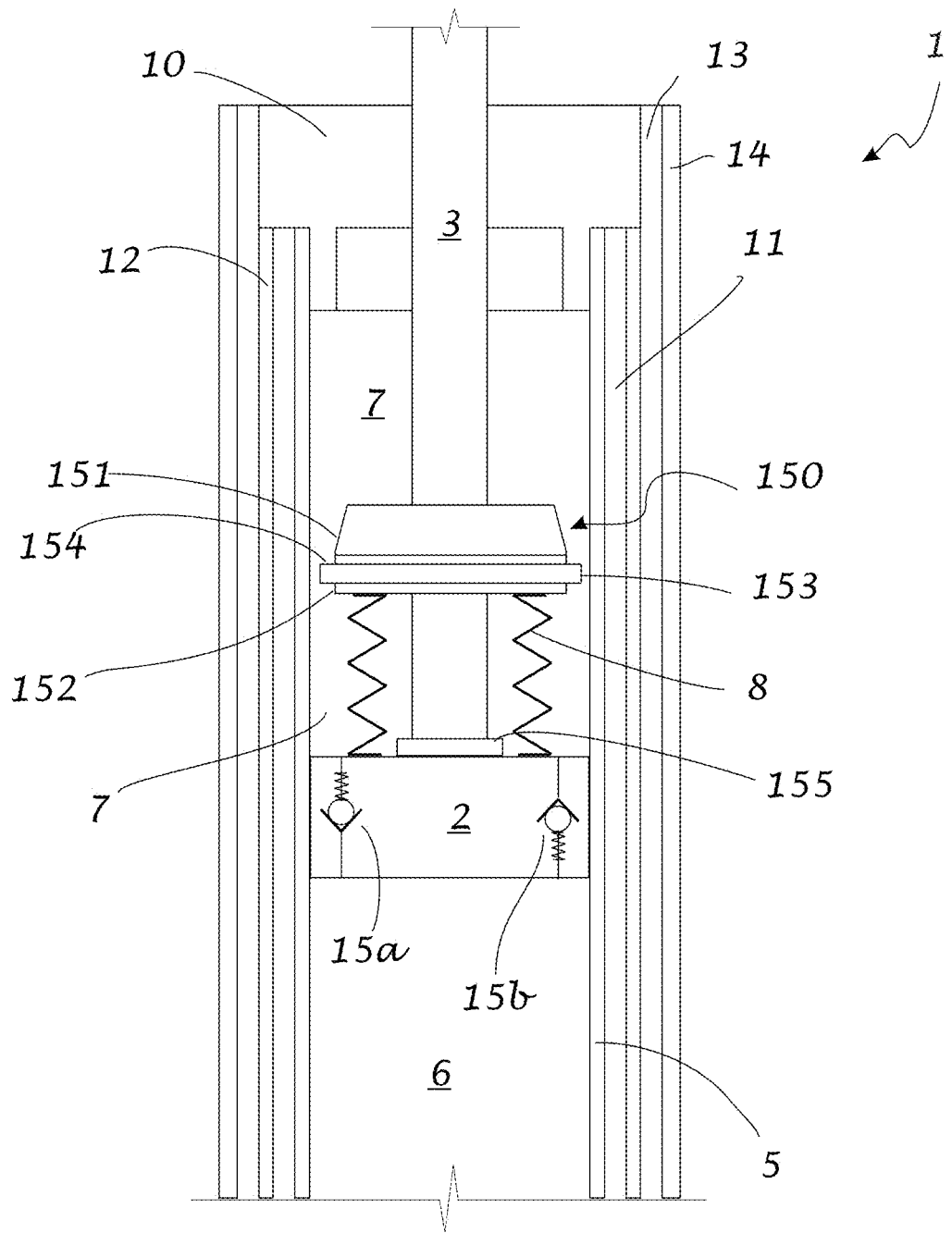
FIG. 18 illustrates another aspect of an embodiment of a damper comprising a piston, a piston rod, and a hydraulic bump stop with a closure plug that is configured to mate with the diverter valve assembly.

FIG. 18 illustrates an aspect of another embodiment of a triple tube damper housing 1 with a piston 2, piston rod 3, and a hydraulic bump stop with a closure plug 150. Closure plug 150 is substantially cylindrical with a central cylindrical axial opening that slideably receives piston rod 3. Closure plug 150 includes a conical frustum section 151 at one end and a cylindrical section 152 at the second end with a radially outwardly extending flange 153 which forms an annular sealing surface 154.

In FIG. 18, the piston is shown in a mid-stroke operating position in the pressure tube 5. The piston 2 is attached to the rod 3 and divides the volume within pressure tube 5 into a compression volume 6 and an extension volume 7. Closure plug 150 is attached to piston 2 by an intervening compressible member 8. In the embodiment in FIG. 18, during normal operation when the piston moves at least partially through an extension stroke, fluid may flow out of the extension volume and be directed by diverter valve 10 (shown without detail) to annular channel 11 formed by pressure tube 5 and middle tube 12 and/or into annular channel 13 formed between the middle tube 12 and outer tube 14. A compressible member 8 may be, for example, a cylindrical coil spring, a conical coil spring, a wave spring, or an elastomeric spring. In some embodiments there may be free flow of fluid across the compressible member in the radial and/or axial direction and the fully compressed height of the compressible member may be minimized. In some embodiments, compliant spacer 155 may be used to prevent direct contact between closure plug 150 and piston 2. BOVs 15*a* and 15*b* are configured and sized to limit peak pressures in the compression volume 6 and extension volume 7 respectively during operation.

Figure 19:
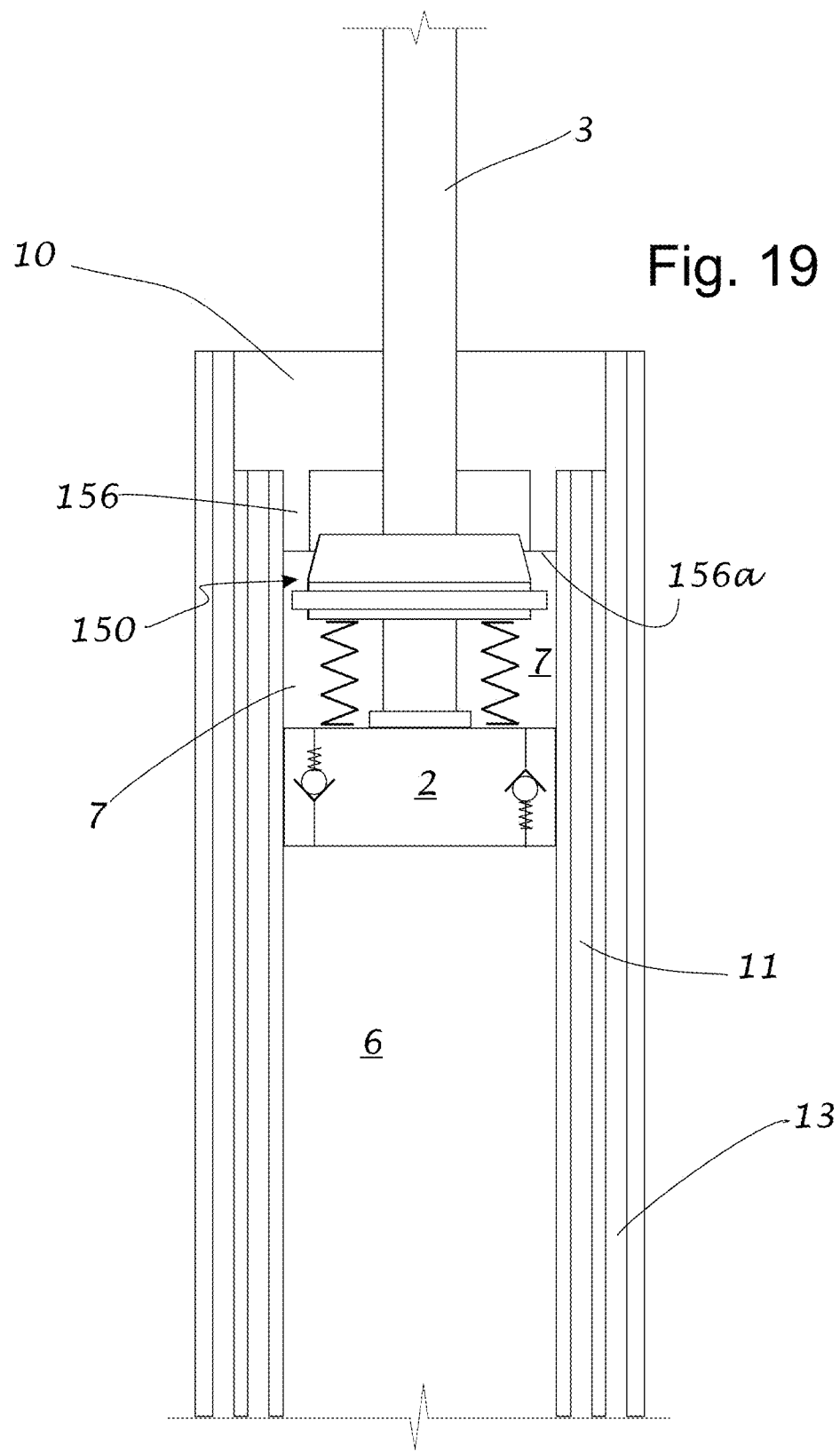
FIG. 19 illustrates the damper of FIG. 18 where the closure plug has partially engaged the diverter valve assembly.

FIG. 19 illustrates the damper of FIG. 18 at a point where the piston 2 is approaching a position of maximum extension. If the piston moves further in the extension direction from this position, closure plug 150 engages the cylindrical protrusion 156 and restricts the flow of fluid from the extension volume to annular channel 11 or annular channel 13 via diverter valve 10. Restricting the flow in this manner increases the pressure in extension volume 6 and resists the motion of the piston in the extension direction.

Figure 20:
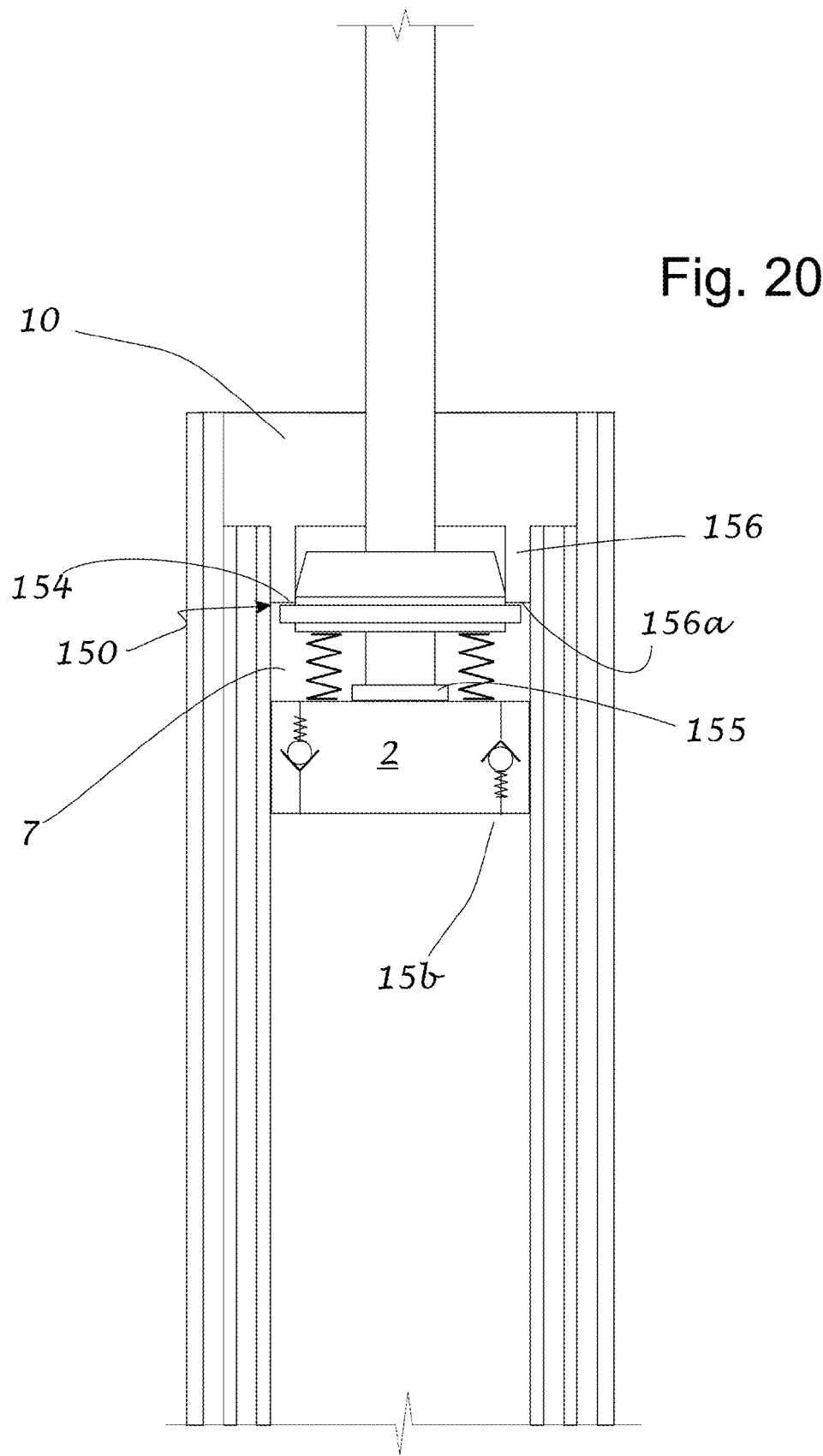
FIG. 20 illustrates the damper of FIG. 18 where the closure plug has fully engaged the diverter valve assembly.

Resistance to the flow of fluid will be augmented as there is increased engagement between the closure plug 150 and protrusion 156. FIG. 20 illustrates the damper of FIG. 18 at a point where the closure plug 150 is fully engaged with the cylindrical protrusion 155. Annular sealing surface 154 provides sealing contact with surface 156*a* of annular protrusion 156 preventing the flow of fluid from the extension volume through diverter valve 10. Further movement of the piston 2 in the extension direction would result in the increase of pressure in the extension volume until BOV 15*b* opens. Increasing the pressure in the extension volume in this manner forms a hydraulic bump stop and slows the motion of the piston at the end of the extension stroke and mitigates the force resulting from any collision between piston 2 and diverter valve 10 as previously described above.

Hydraulic bump stops may be used instead of or in conjunction with conventional bump stops such as those made of compliant materials. In the embodiments described above a diverter valve could be replaced with any other device that directs flow from the extension volume.

Figure 21:
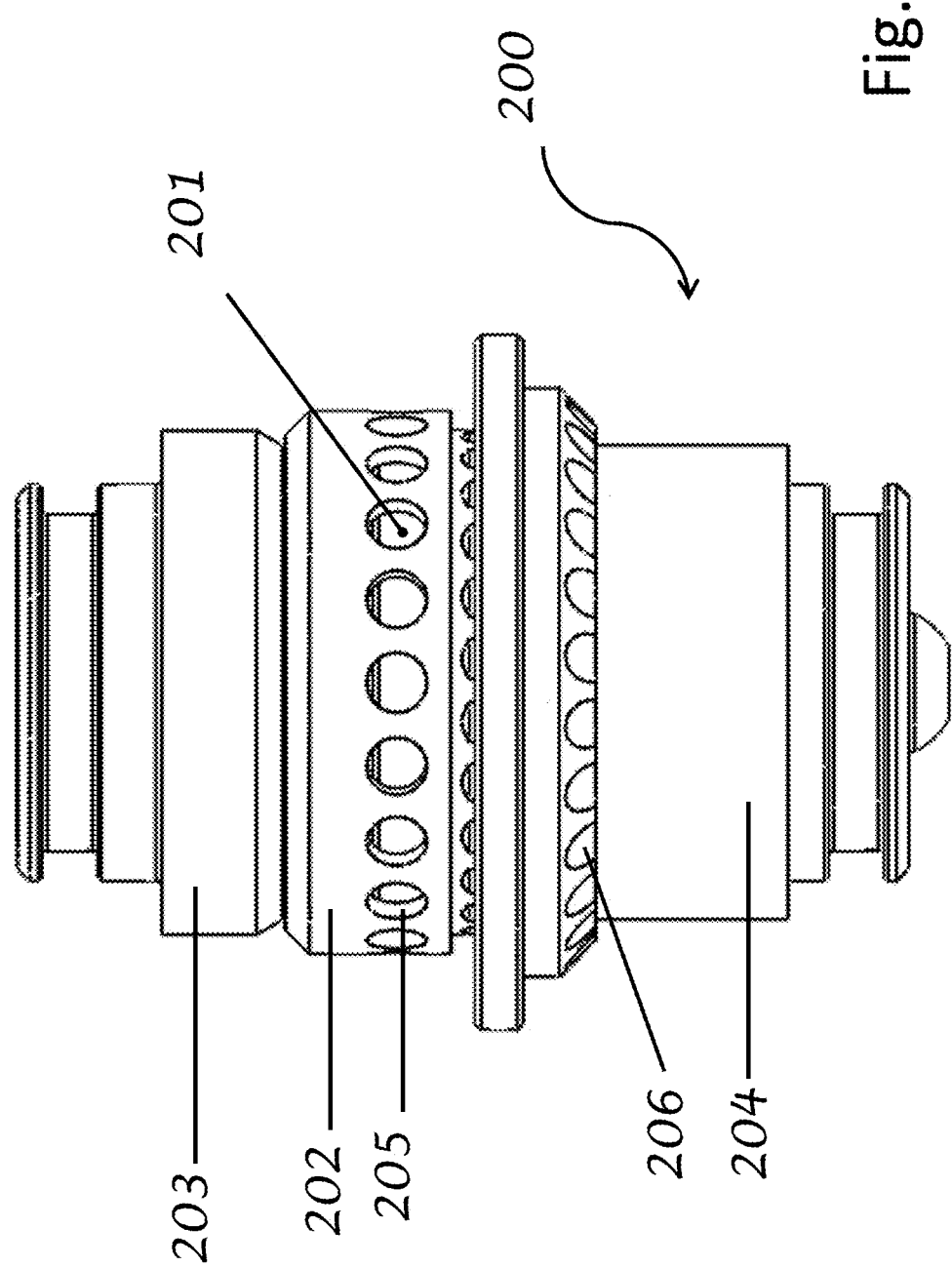
FIG. 21 illustrates an outer side view of an embodiment of a dual-spool diverter valve.

FIG. 21 illustrates an outer view of an embodiment of a dual-spool diverter valve 200. In this embodiment, the top assembly 203 of the dual-spool diverter valve interfaces with a triple tube damper and the bottom assembly 204 of the dual-spool diverter valve interfaces with the hydraulic motor/pump unit. Interposing the dual-spool diverter valve between the damper and the hydraulic motor/pump unit results in reduced dead-length in the active suspension damper by eliminating the need for two individual diverter valves inside the damper body. This permits a longer stroke length, thereby increasing the shock absorber's range of motion. The dual-spool diverter valve 200 includes an inner spool 201, an outer spool 202, a top assembly 203, and a bottom assembly 204. The inner spool 201 and the outer spool 202 are axially moveable elements, whereas the top assembly 203 is fixed in place because it is fixedly engaged by the triple tube damper body and the bottom assembly 204 is fixed in place because it is fixedly engaged by the hydraulic motor/pump unit. However, it should be understood that the various portions of the diverter valve may be held in place by other appropriate structure such as housings of the hydraulic motor/pump unit and/or the damper housing. Radial holes 205 in the outer spool 202 and axial holes 206 in the bottom assembly 204 allow for fluid flow in the different operational modes of the dual-spool diverter valve, which will be further explained below.

Figure 22:
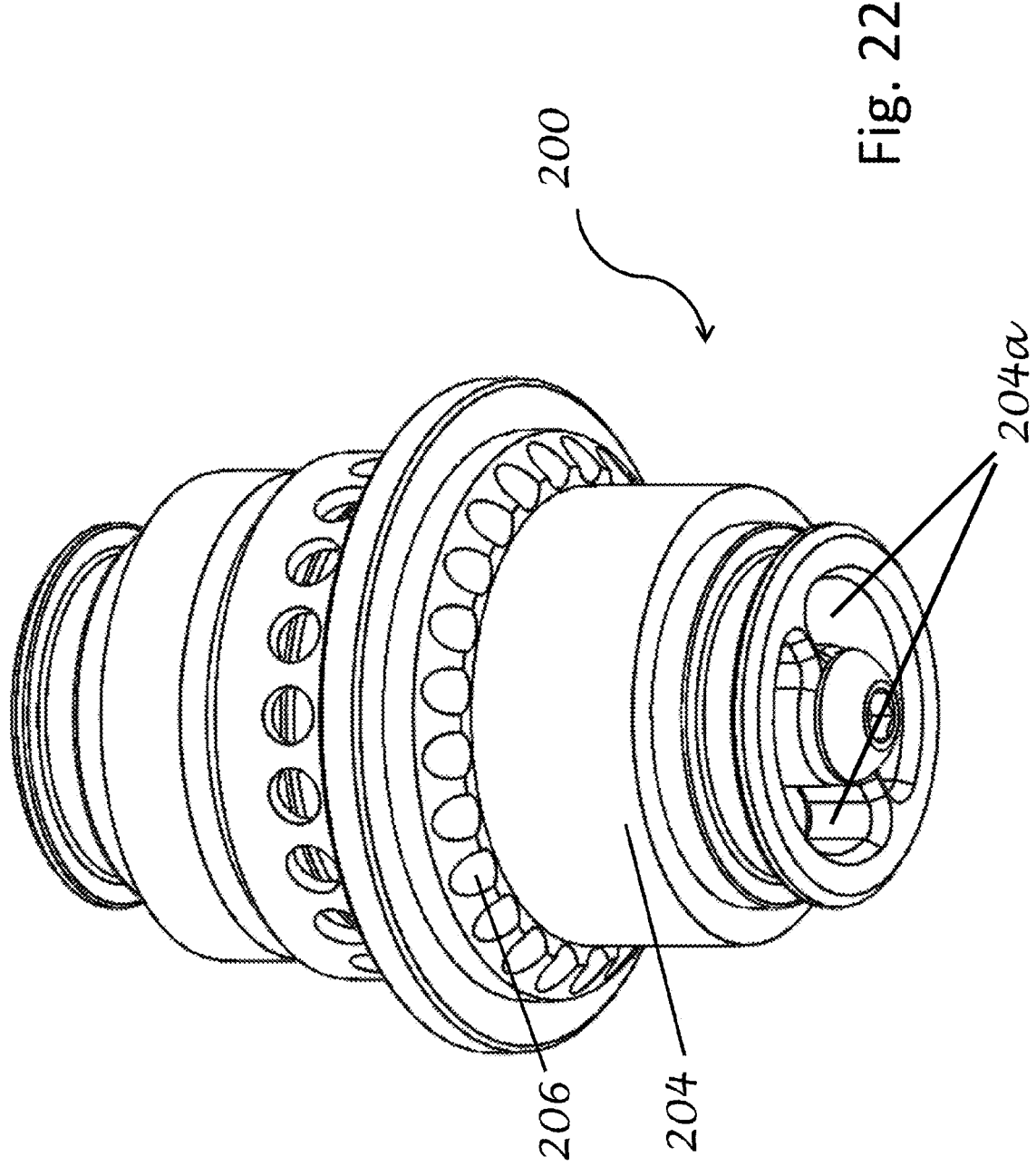
FIG. 22 illustrates an outer isometric view of an embodiment of the dual-spool diverter valve of FIG. 21.

FIG. 22 shows an isometric view of the dual-spool diverter valve shown in FIG. 21. One end of the flow passageway 204*a* through the center of the dual-spool diverter valve is shown at the bottom assembly 204. Axial holes 206 in the bottom assembly 204 are also shown provide a flow path between the hydraulic motor/pump and the compression volume (as shown in FIG. 23).

Figure 23:
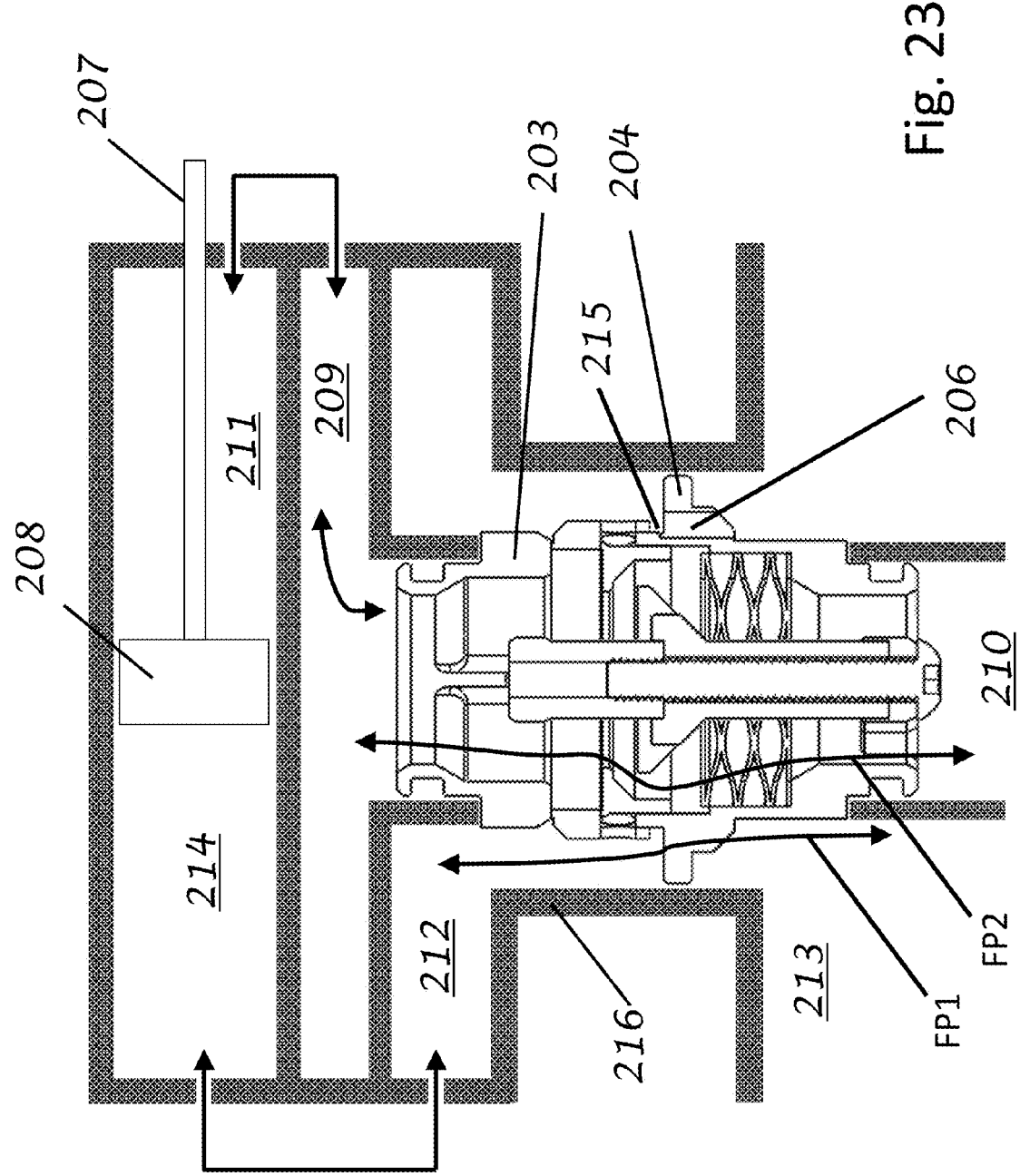
FIG. 23 depicts a schematic of an aspect of the fluid flow paths in an active hydraulic system actuator and the dual-spool diverter valve of FIG. 21.

FIG. 23 illustrates flow exchange between the dual-spool diverter valve and the triple tube damper and between the dual-spool diverter valve and the hydraulic motor/pump unit. Piston rod 7 attaches to piston 208 on the first side of piston 208. The piston 208 divides the volume inside the inner tube of the triple tube damper into an extension and a compression volume. The extension volume is adjacent to the side of the piston 208 that is attached to the piston rod 207 and the compression volume is adjacent to the opposite side of the piston. FP1 indicates the hydraulic flow path between a first port of the hydraulic motor pump (not shown) and the annular space 212 and FP2 indicates the hydraulic flow path between a second port of the hydraulic motor pump (not shown) and annular space 209.

In some embodiments, a top assembly 203 of the dual-spool diverter valve interfaces with the middle tube of the triple tube damper and creates a flow path between the annular space between the damper's inner and middle tubes 209 and the first side of the hydraulic motor/pump, which is in fluid communication with flow space 210. Flow space 210 is adjacent to the dual-spool diverter valve's bottom assembly 204. The annular space between the inner and middle tubes 209 is in fluid communication with the extension volume 211. The bottom assembly 204 of the dual-spool diverter valve interfaces with the hydraulic motor/pump unit and creates a flow path between the annular space between the middle and outer tubes 212 and the second side of the hydraulic motor/pump, which is in fluid communication with flow space 213. The annular space 212 between the middle and outer tubes is in fluid communication with compression volume 214. Axial holes 206 are restricted by protrusion 215 of the outer spool 202. This restricted opening is sized such that after the dual-spool diverter valve's outer spool activates (shown in FIG. 27), the flow area limits flow to the pump. The terms "top assembly" and "bottom assembly" as used herein are used only to simplify the description of the embodiments to which they refer. They reflect the orientation of these components as they are shown in the figures. In use, these components may be arranged and/or used in any convenient orientation.

Figure 24:
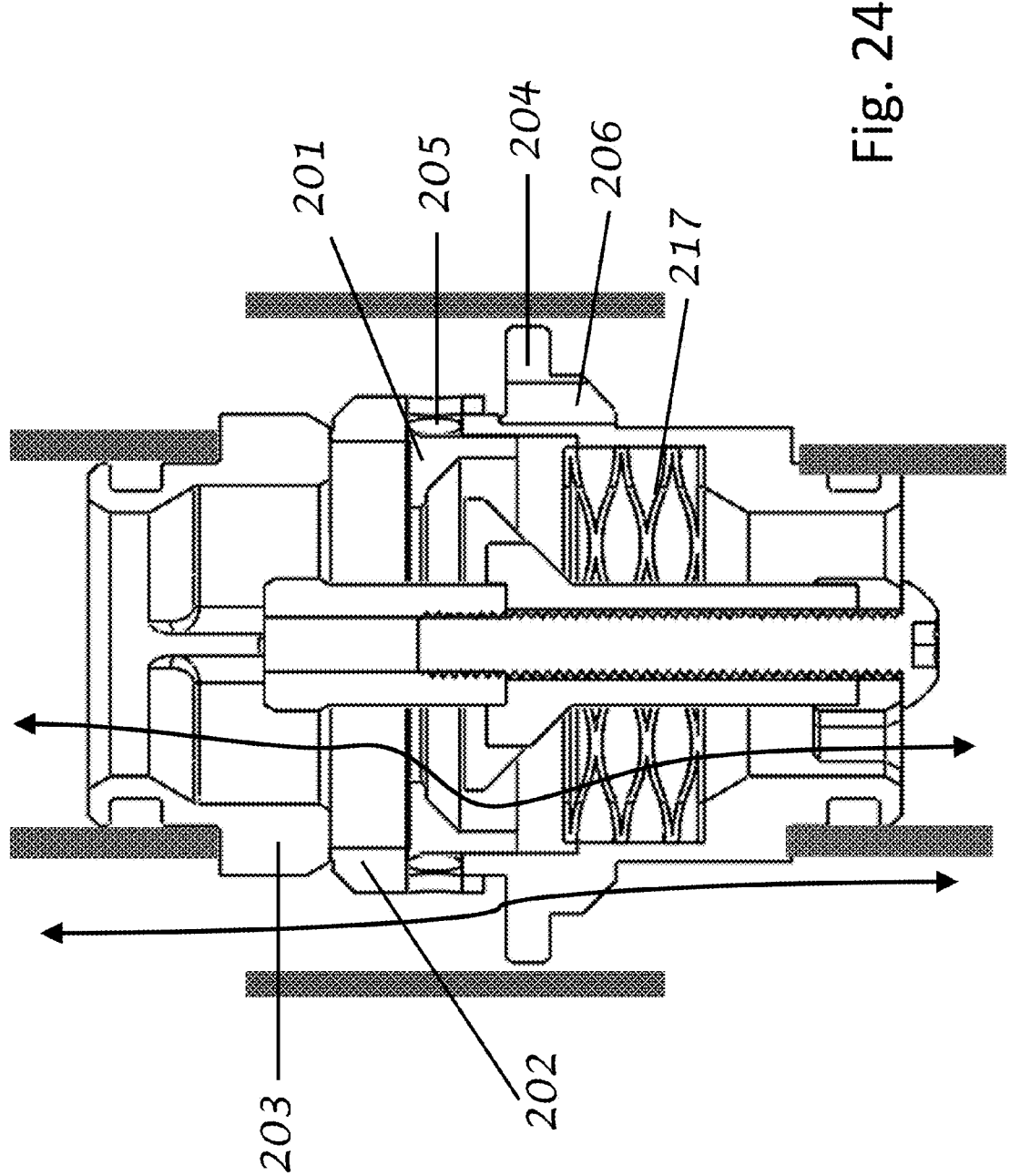
FIG. 24 illustrates a cross section of the embodiment of the dual-spool diverter valve of FIG. 21 in a normal operating mode, where neither the inner nor the outer spool is activated.

FIG. 24 illustrates a cross section of an embodiment of a dual-spool diverter valve where neither the inner nor the outer spool is activated. Also shown are the resulting fluid flow paths. In its inactivated position, outer spool 202 is axially biased against the dual-spool diverter valve's top assembly 203, preventing any flow from bypassing the hydraulic motor/pump unit and thereby forcing the entirety of the fluid flow toward the hydraulic motor/pump, down through the center of the outer spool 202. In its inactive position, the inner spool 201 is axially biased against the outer spool, preventing flow through radial holes 205 in outer spool 202, preventing any flow from bypassing the hydraulic motor/pump unit and thereby forcing the entirety of the fluid flow toward the hydraulic motor/pump down through the center of the inner spool. Each of these spools is axially biased in their inactive positions by biasing element 217, which is sized in a way to allow for the tuning of each spool for activation at different flow velocities. Biasing element 217 may be, for example, a wave spring, coil spring, or other means for biasing the inner spool 201 and outer spool 202, such that they activate at particular predetermined flow velocities. Activation of each spool allows for a different bypass flow path to be opened, which allows fluid to bypass the hydraulic motor/pump in both the compression and the extension stroke of the damper to prevent the motor/pump from overspinning.

Figure 25:
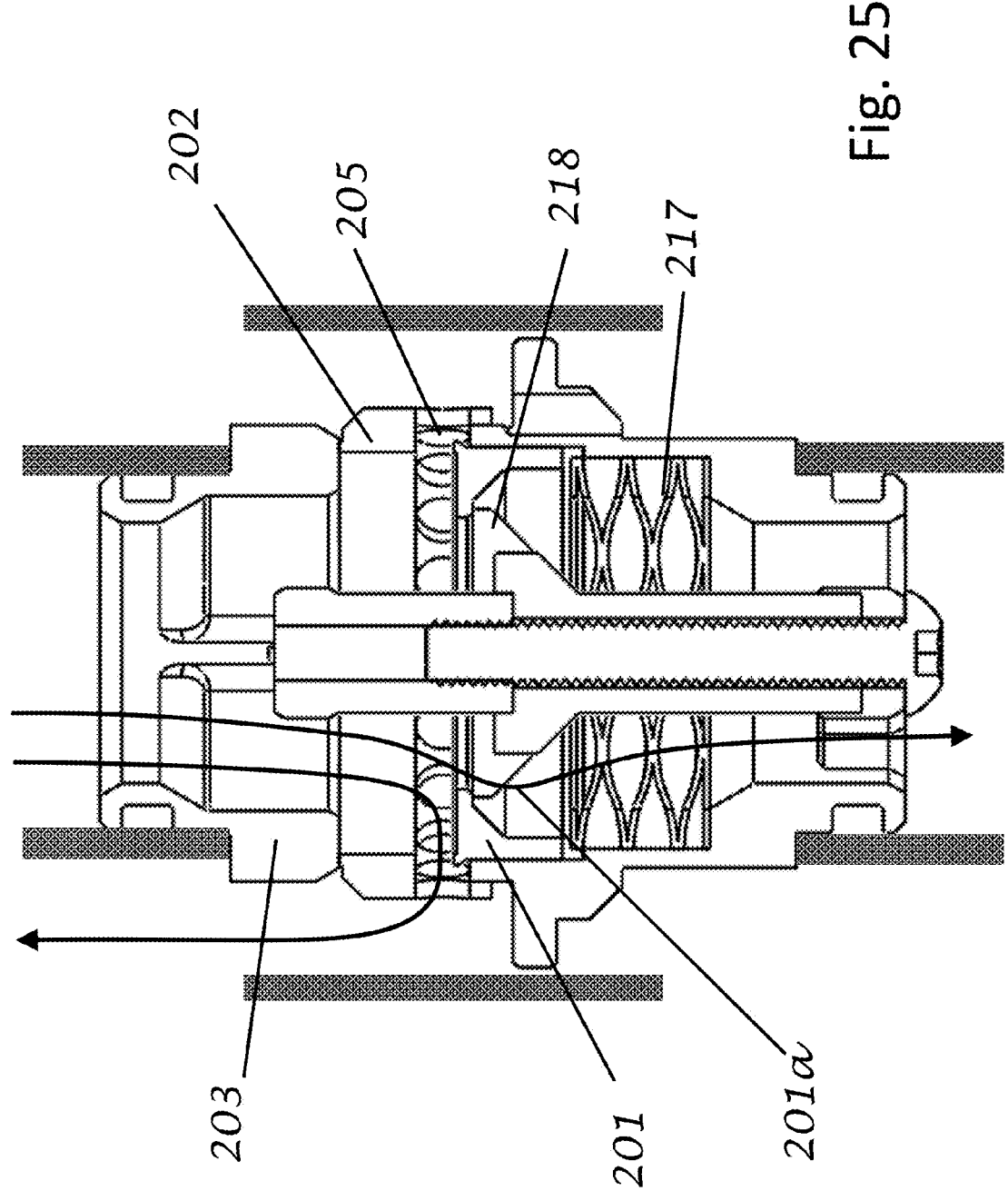
FIG. 25 illustrates a cross section of the embodiment of the dual-spool diverter valve of FIG. 21, where the inner spool is activated.
Figure 26:
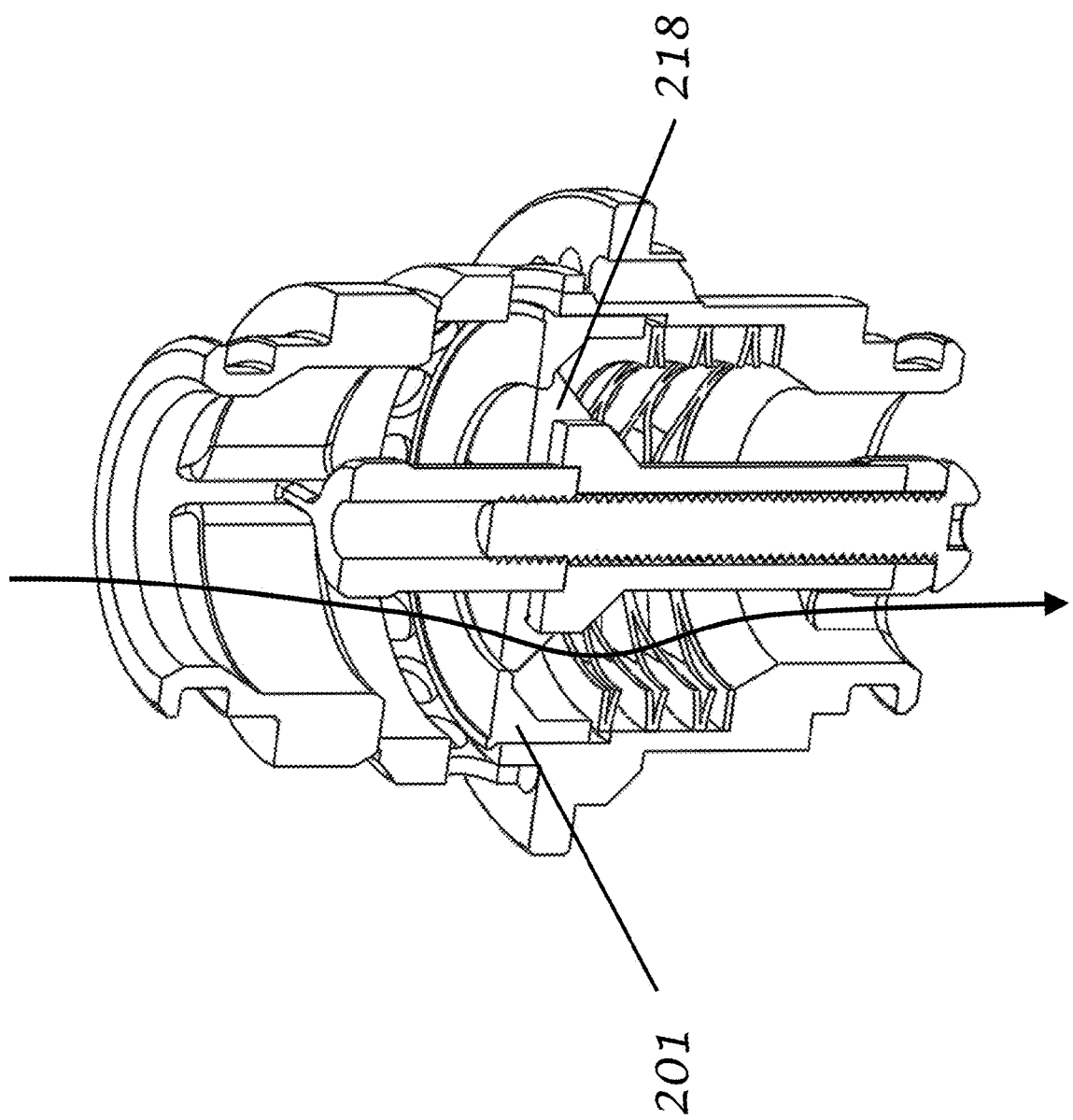
FIG. 26 illustrates an isometric view of a partial cross section of the embodiment of the dual-spool diverter valve of FIG. 21, where the inner spool is activated.

FIG. 25 illustrates a cross section of an embodiment of a dual-spool diverter valve wherein the inner spool is activated. The resulting altered fluid flow paths from this activation are shown. During the extension stroke of the active suspension damper, fluid flows from the extension chamber and into the dual-spool diverter valve. This fluid flow creates a pressure drop across the restriction 201a created between the inner spool 201 and the base assembly (element 204 shown in FIG. 23), which creates a net force on the inner spool 201 in the axial direction. When the axial force created by the restriction exceeds the biasing force of biasing element 217, the inner spool 201 moves downward and exposes radial holes 205 in the outer spool 202. The exposure of these radial holes creates a bypass flow path into the space between the outer flow tube (element 216 shown in FIG. 23) and the dual-spool diverter valve. This flow path allows fluid to flow from the damper's extension chamber into the triple tube damper's inner and middle tubes (element 209 shown in FIG. 23), through the dual-spool diverter valve, into the annular space between the triple tube damper's outer and middle tubes (element 212 shown in FIG. 23), and into its compression chamber without flowing through the hydraulic motor/pump. As shown in FIG. 26, the downward movement of the inner spool 201 also substantially closes the fluid flow path through the dual-spool diverter into the hydraulic motor/pump unit between the inner spool 201 and the middle element 218, throttling flow into the hydraulic motor/pump. After activation, metered flow to the hydraulic motor/pump occurs through the step-down notches in element 218 though the inner spool 201 substantially closes on the outer rim of middle element 218.

In another embodiment, after activation, metered flow to the hydraulic motor/pump may occur through axial holes located in the inner spool. This flow is tunable by sizing the holes in the inner spool 201. These holes could be replaced by notches or other ports in the inner spool depending on the flow rate desired. These holes could also be combined with notches in middle element 218 if desired.

Figure 27:
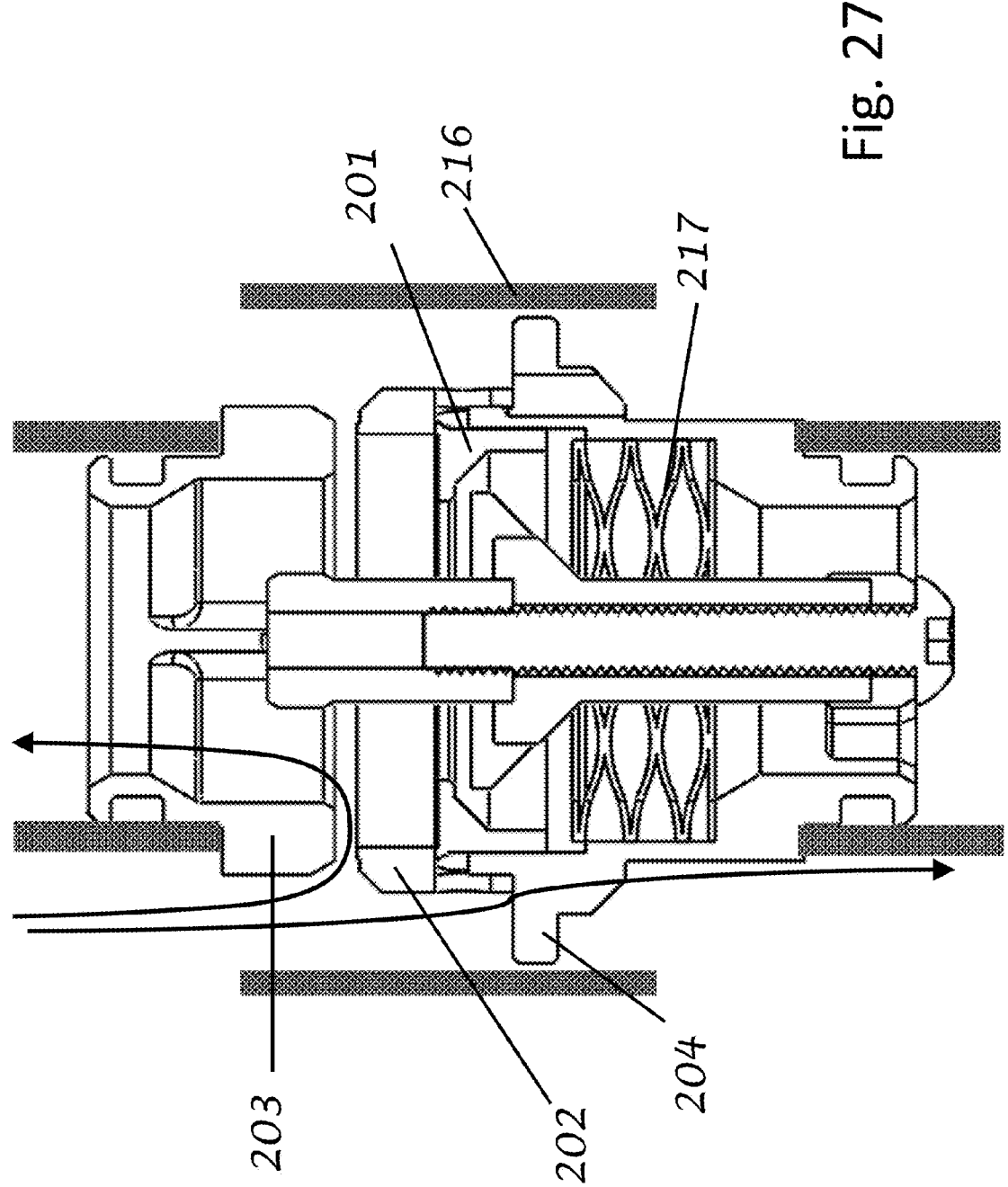
FIG. 27 illustrates a cross section of the embodiment of the dual-spool diverter valve of FIG. 21 where the outer spool is activated.

FIG. 27 illustrates a cross section of an embodiment of a dual-spool diverter valve where the outer spool is activated. The resulting fluid flow paths are also shown. During compression of the active suspension damper, fluid flows from the compression chamber into the triple tube damper's outer tube, and into the dual-spool diverter valve. This fluid flow causes a pressure drop across the restriction of outer spool 202 created between the outer spool 202 and the outer flow tube 216. When the net force on the outer spool 202 created by the restriction due to the fluid flow, exceeds the biasing force of biasing element 217, the outer spool moves downward creating a gap between the top assembly 203 and the outer spool 202. This gap creates a bypass flow path from the space between the outer flow tube 216 and the dual-spool diverter valve into the dual-spool diverter valve. This flow path allows fluid to flow from the damper's compression chamber into the annular space between the triple tube damper's middle and outer tubes (element 212 shown in FIG. 23), through the dual-spool diverter valve, into the annular space between the triple tube damper's inner and middle tubes (element 209 shown in FIG. 23), and back into its extension chamber without flowing through the hydraulic motor/pump. The downward movement of the outer spool 202 also substantially blocks the fluid flow path through the bottom assembly 204, throttling flow into the hydraulic motor/pump. After activation, metered flow to the hydraulic motor/pump occurs through axial holes 206 and between the bottom assembly 204 of the dual-spool diverter valve and the outer flow tube 216. This flow is tunable by sizing the axial holes 206 in bottom assembly 204 and the annular area between the outside of the dual-spool diverter valve and the outer flow tube 216.

Figure 28:
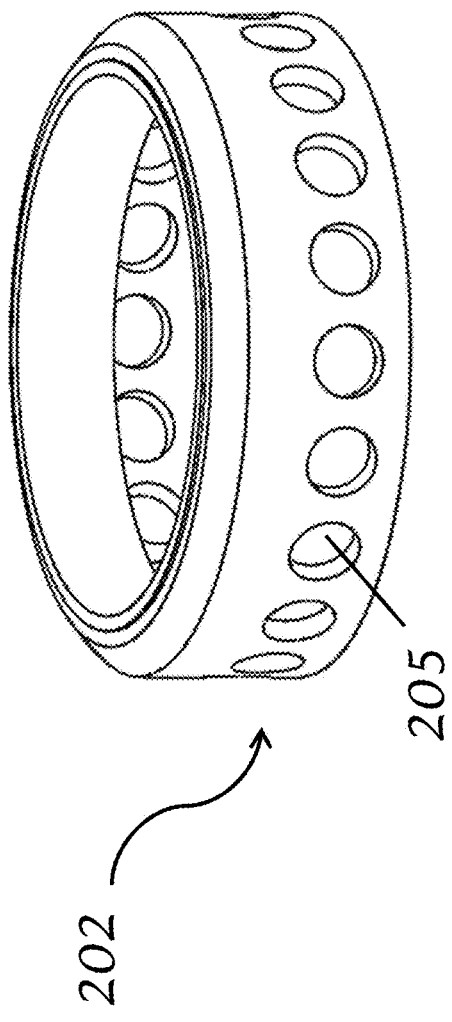
FIG. 28 illustrates a isometric view of the outer spool of the dual-spool diverter valve of FIG. 21
Figure 29:
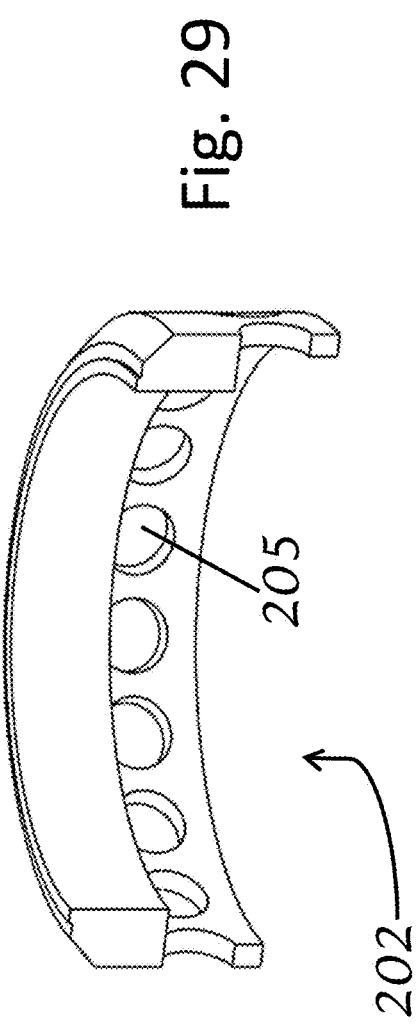
FIG. 29 depicts an isometric view of a partial cross section of the outer spool shown in FIG. 28.

FIG. 28 and FIG. 29 illustrate an outer spool 202 of an embodiment of a dual-spool diverter valve. FIG. 29 is a cross section of the outer spool 202. Radial holes 205 allow a bypass flow path to be created upon activation of the dual-spool diverter valve's inner spool. This bypass flow path allows fluid to bypass the hydraulic motor/pump and prevent its overspinning when the damper is in compression. These holes are sized to minimize fluid restriction. A fluid restriction is formed between the outer spool 202 and the outer flow tube (element 216 shown in FIG. 27). The restriction produces an axial net force on the outer spool 202, which causes it to activate at a preset flow rate and create the second bypass flow path. This second bypass flow path allows fluid to bypass the hydraulic motor/pump and prevent its overspinning when the damper is in compression.

Figure 30:
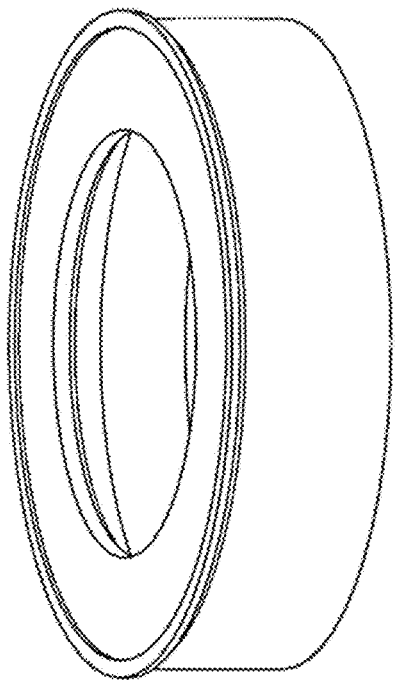
FIG. 30 illustrates a perspective view of the inner spool of the dual-spool diverter valve shown in FIG. 21.
Figure 31:
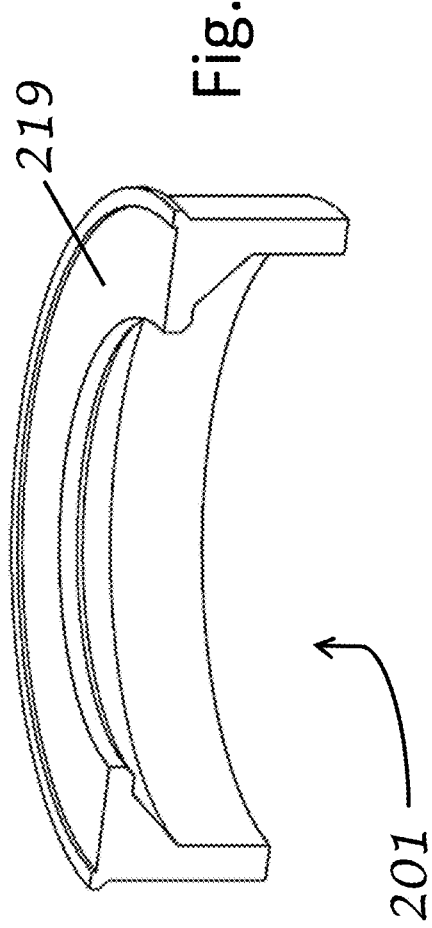
FIG. 31 depicts an isometric view of a partial cross section of the inner spool shown in FIG. 30.

FIG. 30 illustrates the inner spool of an embodiment of a dual-spool diverter valve. FIG. 31 depicts a cross section of the inner spool of an embodiment of a dual-spool diverter valve. A fluid restriction is formed between the inner spool 201 and the base assembly. The restriction produces an axial net force on the inner spool 201 which causes it to activate at a preset flow rate and create a bypass flow path. This restriction is sized to affect the pressure drop across the spool and thereby the preset activation flow rate, along with the preload force applied by the biasing element (element 217 shown in FIG. 24). This bypass flow path allows fluid to bypass the hydraulic motor/pump and prevent its overspinning when the damper is in extension. Metered flow to the hydraulic motor/pump may be achieved by adding axial holes, notches, or other ports (not shown) into the face 219 of the inner spool.

Figure 32:
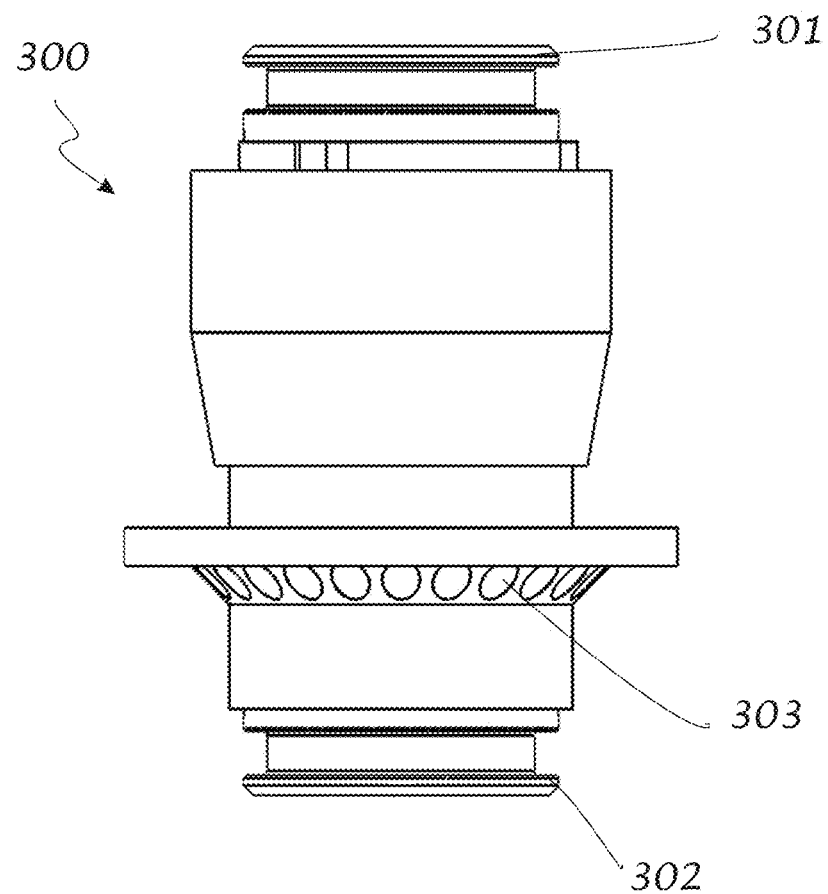
FIG. 32 illustrates an outer side view of an embodiment of a single-spool diverter valve.

FIG. 32 illustrates a side view of an embodiment of a single-spool bi-directional diverter valve 300. Such a diverter valve may be used to interface with a damper with a hydraulic motor/pump unit. In such an arrangement, the top assembly 301 may interface, for example, the inner and outer flow channels of a triple tube damper, while the bottom assembly 302 may interface the hydraulic motor/pump unit. As in the case of the dual spool bi-directional diverter valve, interposing the single-spool bi-directional diverter valve between the damper and the hydraulic motor/pump unit may result in reduced dead-length in the active suspension damper by eliminating the need for two individual diverter valves inside the damper body as disclosed in U.S. patent application Ser. No. 14/602,463, entitled "ACTIVE VEHICLE SUSPENSION SYSTEM,". The use of single spool bi-directional diverter valves permits a longer stroke length, thereby increasing the shock absorber's range of motion. Embodiments of the single-spool diverter valve 300 may include a top assembly 301, and a bottom assembly 302, and axial holes 303.

Figure 33:
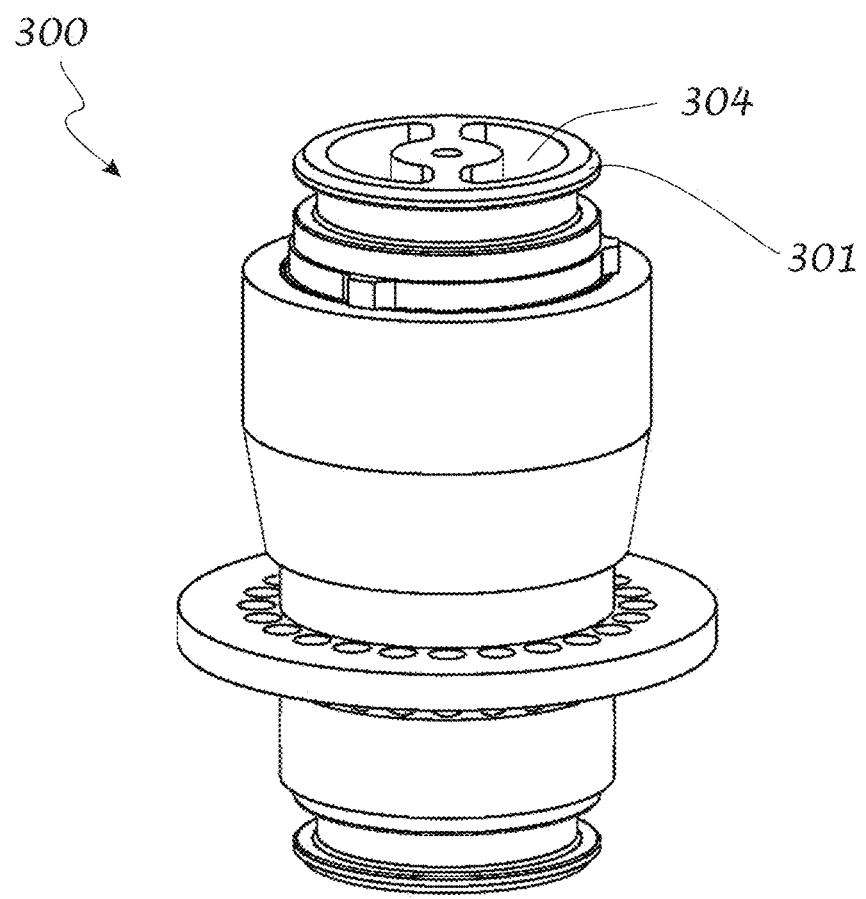
FIG. 33 illustrates an outer isometric view of an embodiment of the single-spool diverter valve of FIG. 32.

FIG. 33 shows an isometric view of the single-spool bi-directional diverter valve shown in FIG. 32. One end of the flow passageway 304 through the center of the single-spool diverter valve is shown in the top assembly 301. Axial holes 303 in the bottom assembly 204 are also shown.

Figure 34:
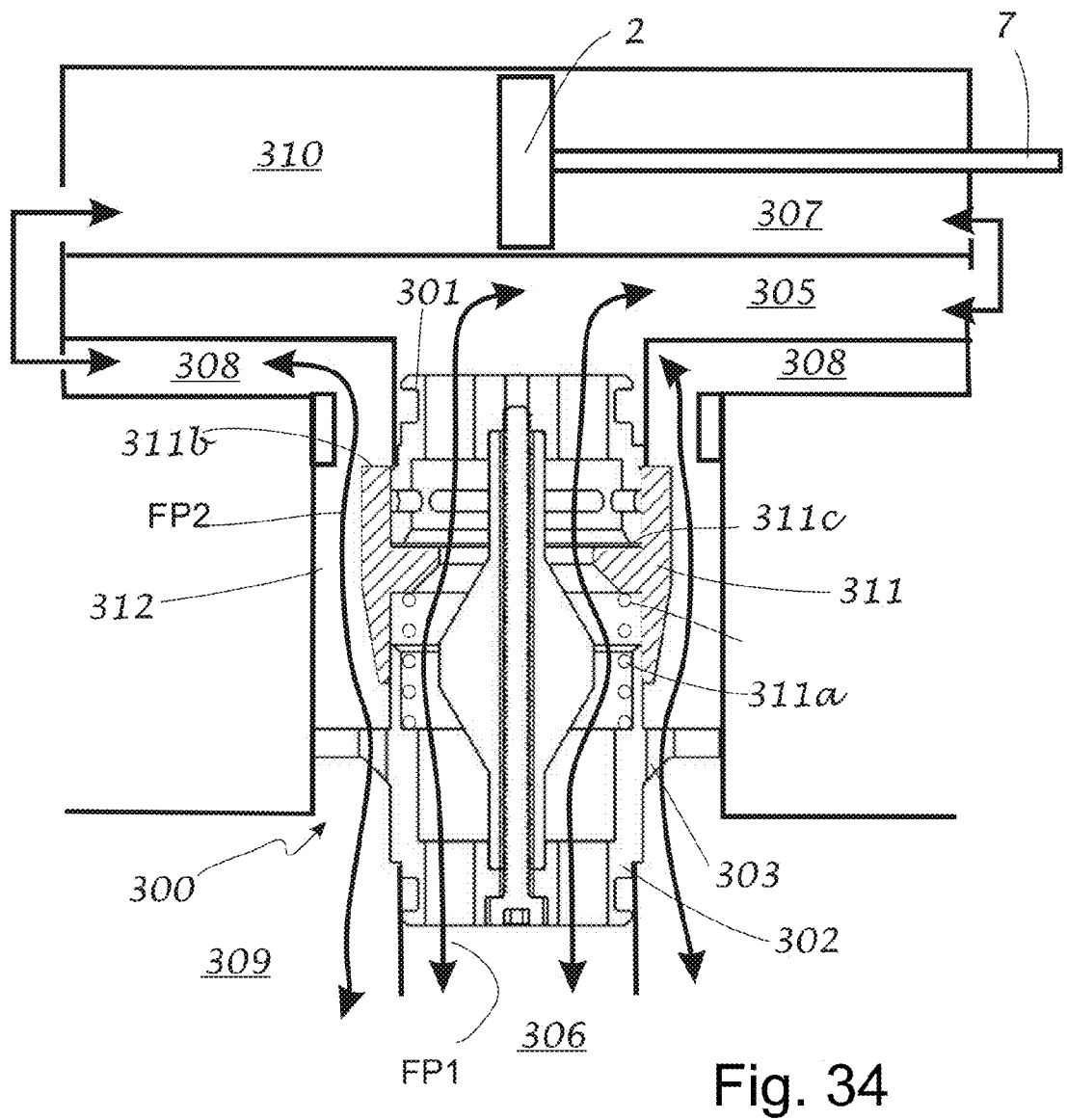
FIG. 34 depicts a schematic of an aspect of the fluid flow paths of an active hydraulic system actuator and the single-spool bi-directional diverter valve of FIG. 32.

FIG. 34 illustrates flow exchange between the compression volume 310 and the extension volume 307 of a triple tube damper and a hydraulic motor/pump via the single-spool bi-directional diverter valve 300. Piston 2 attaches to piston rod 7 on the first side of the piston 2. The piston 2 divides the volume inside the inner tube of the triple tube damper into an extension volume and a compression volume. The extension volume is adjacent to the side of the piston 2 that is attached to the piston rod 7 and the compression volume is adjacent to the opposite side of the piston.

The top assembly 301 of the single-spool diverter valve interfaces with the inner annular conduit 305 of the triple tube damper (Only the portion of the annular conduit on one side of the centerline of the damper is shown). It establishes a flow path FP1 inner annular conduit 305 and the first port of a hydraulic motor/pump (not shown), via flow space 306. Flow space 306 is adjacent to the single-spool diverter valve's bottom assembly 302. The inner annular conduit 305 is in fluid communication with the extension volume 307. The bottom assembly 302 of the single-spool diverter valve interfaces with the hydraulic motor/pump unit and also establishes a flow path between the outer annular conduit 308 and the second port of the hydraulic motor/pump, which is in fluid communication with flow space 309. The annular space 308 between the middle and outer tubes is in fluid communication with compression volume 310 along flow path FP2. FIG. 34 shows spool 311 of the diverter valve that is biased in a closed position by coil spring 311a (shown in cross section). Fluid flowing from outer annular conduit 308 to flow space 309 impinges on annular surface 311b. Fluid flowing from inner annular conduit to flow space 306 impinges on annular surface 311c. The interaction of either or both of these flows with surfaces 311b and 311c increases the net axial static pressure on spool 311 which produces a net force in the axial direction that opposes the force of spring 311a.

Figure 35:
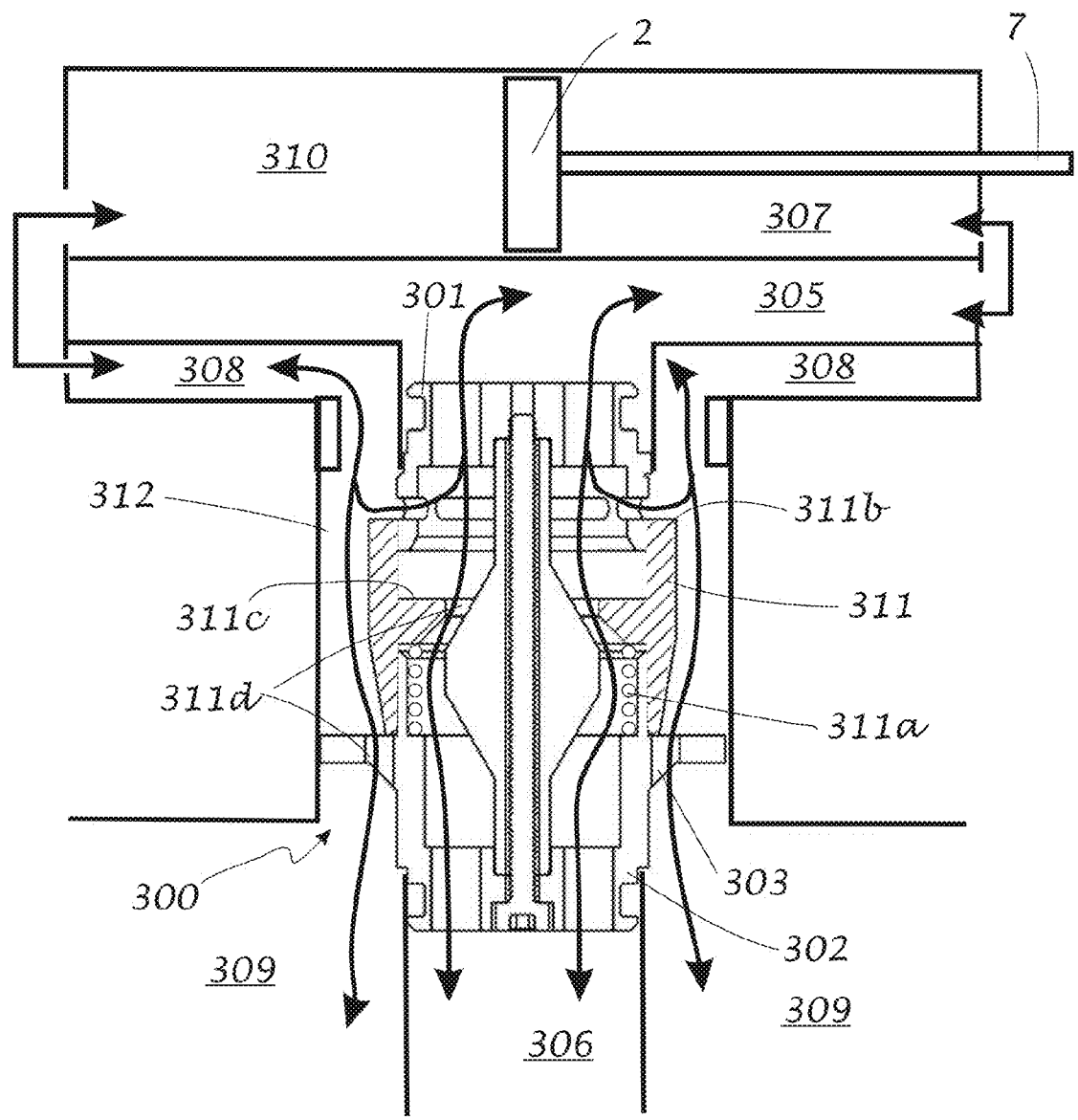
FIG. 35 depicts a schematic of the single-spool bi-directional diverter valve of FIG. 34 with the spool in the fully open position.

When the net force as a result of the increase in static pressure on spool 311 is such that the net axial fluid dynamic force on the spool is greater than the spring force and in the opposite direction, the spool valve 300 is activated. If the net fluid mechanical force is sufficient, the spool will reach the fully open position shown in FIG. 35. When the spool is in the open position, at least some of the flow is able to flow between annular conduit 308 and annular conduit 305 without flowing through the hydraulic motor/pump. Also, in the fully open position of the embodiment in FIG. 35 the flow along flow paths FP1 and FP2 may be metered by restrictions 311d.

Figure 36:
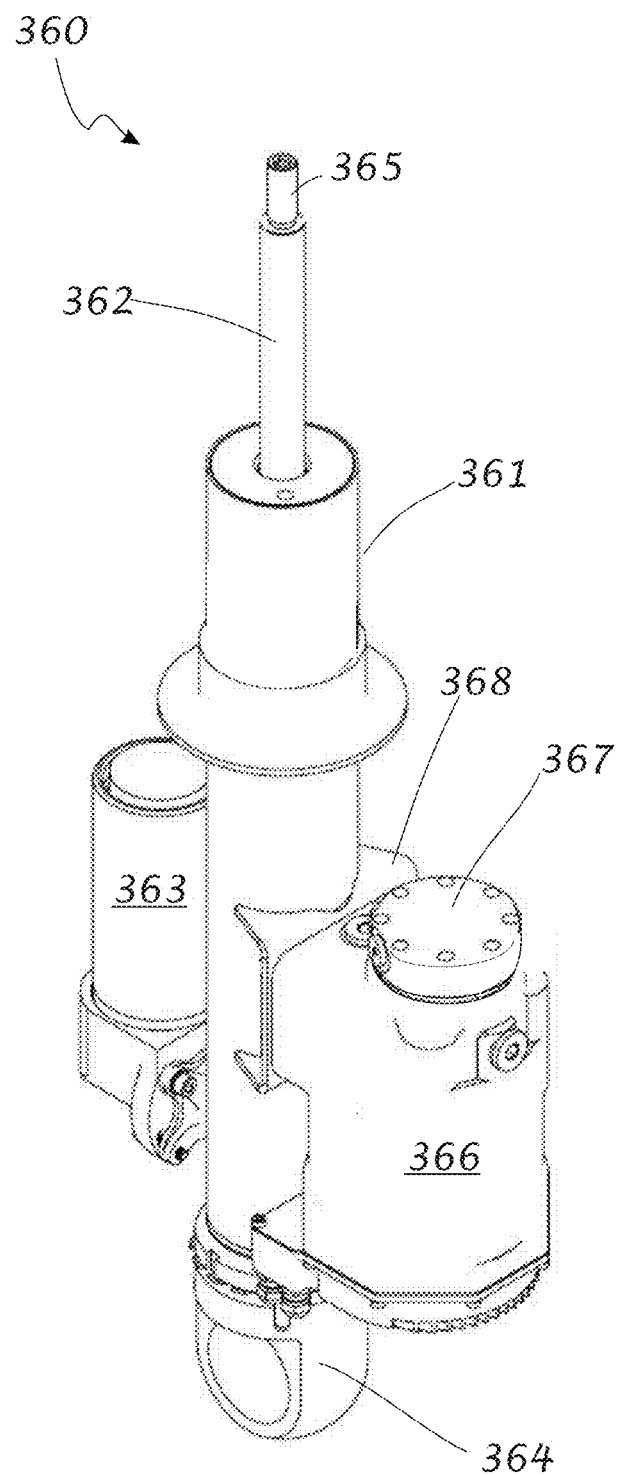
FIG. 36 illustrates an embodiment of an active suspension system actuator with an external accumulator and hydraulic motor/pump unit.
Figure 37:
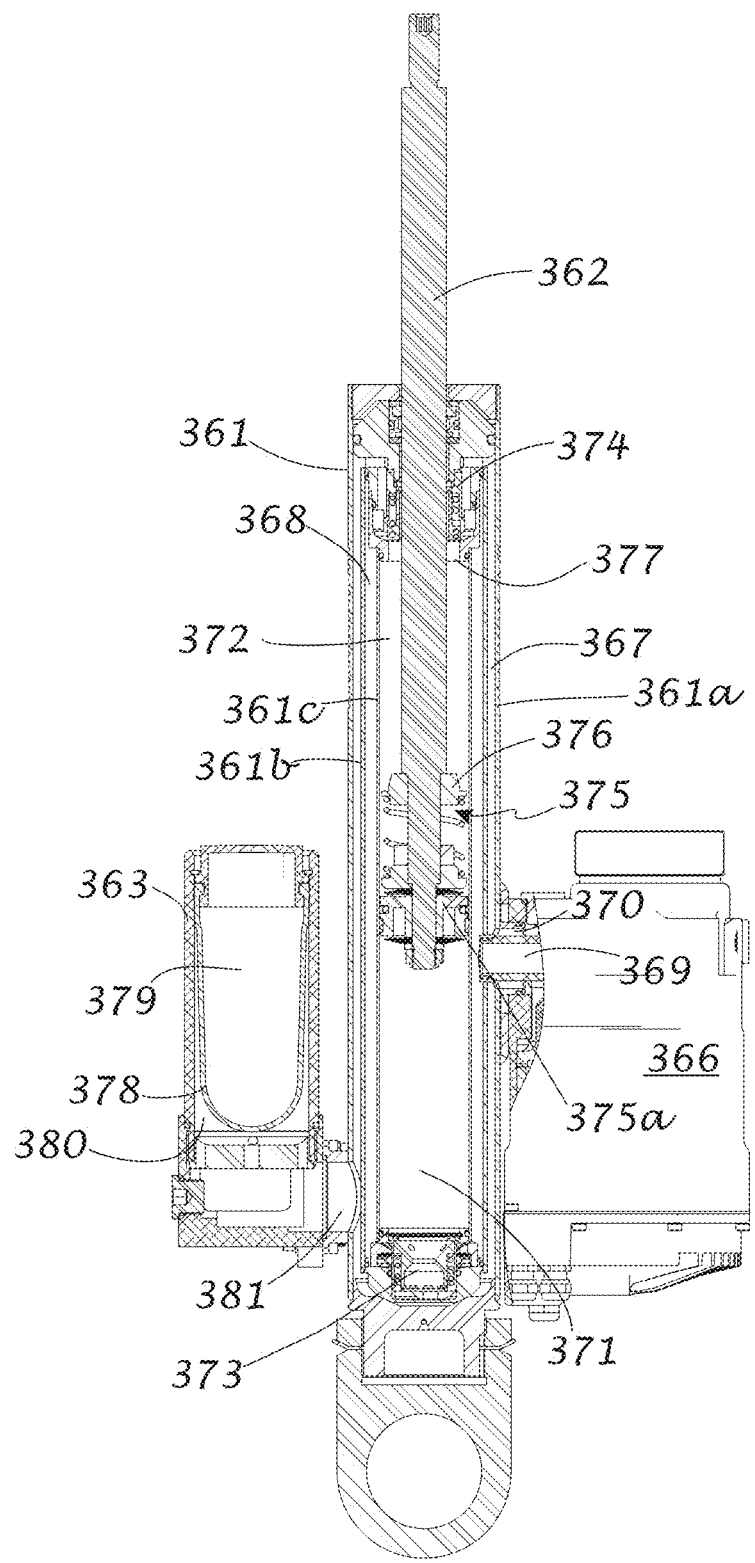
FIG. 37 illustrates a partial cross section of the embodiment of an active suspension system actuator of FIG. 36.

FIG. 36 illustrates an aspect of an embodiment of an active electro-hydraulic suspension system actuator 360 comprising an actuator housing 361, which includes an piston (not shown) with piston rod 362. The accumulator (reservoir) 363 is external and attached to the actuator housing 361 and in communication with the compression volume. Lower eyelet mount 364 and top mount attachment 365 may be used to secure the actuator to the wheel assembly and vehicle body respectively. An external accumulator may be used instead of an internal accumulator (shown in FIG. 6) to reduce the dead-length of the actuator. The hydraulic motor/pump unit 366 includes a hydraulic motor/pump (not shown), an electric motor/generator (not shown), an electronic controller (not shown), and noise control buffers 367. FIG. 37 illustrates a schematic of the actuator in FIG. 36 with the motor/pump unit 366, removed exposing the attachment flange 368. In some embodiments eyelet mount 364 may be replaced with a fork mount.

FIG. 37 illustrates a partial cross section of the actuator in FIG. 36 with actuator housing 361, accumulator 363, and hydraulic motor/pump unit 366. The actuator housing is made up of outer tube 361a, middle tube 361b, and pressure tube 361c. The three tubes form an outer annular conduit 367 and an inner conduit 368. These conduits are in fluid communication, respectively, with a first and a second port of the hydraulic motor/pump in the hydraulic motor/pump unit by means of flow tube 369 and annular flow duct 370. The conduits are also in fluid communication with the compression volume 371 and extension volume 372 via lower diverter valve 373 and upper diverter valve 374. Hydraulic bump stop 375 includes closure plug 376, which engages the annular opening 377 of upper diverter valve 374 when the piston 375 approaches its point of maximum extension.

The accumulator 363 includes diaphragm 378. The diaphragm separates a region 379, which contains high-pressure gas, from hydraulic fluid 380 which is in fluid communication with the compression volume 371. In some embodiments the conduit 381 connecting the hydraulic fluid 380 in the accumulator to the hydraulic fluid in the compression volume may be 10 mm to 30 mm in diameter and 1 mm to 20 mm in length in order to mitigate hydraulic noise generated by the hydraulic motor/pump. Applicants have discovered that reducing the length and increasing the diameter of conduit 381 mitigates the hydraulic noise generated by the hydraulic motor/pump. The ranges of diameter and length were selected for a hydraulic gerotor pump operating at approximately 5000 RPM and producing a flow rate of 50 liters per minute. This configuration mitigates hydraulic pressure fluctuations generated by the hydraulic motor/pump unit. Diaphragm 378 used in the accumulator may, for example, be bladder # SKBL460103 manufactured by Race Tech.

Figure 38:
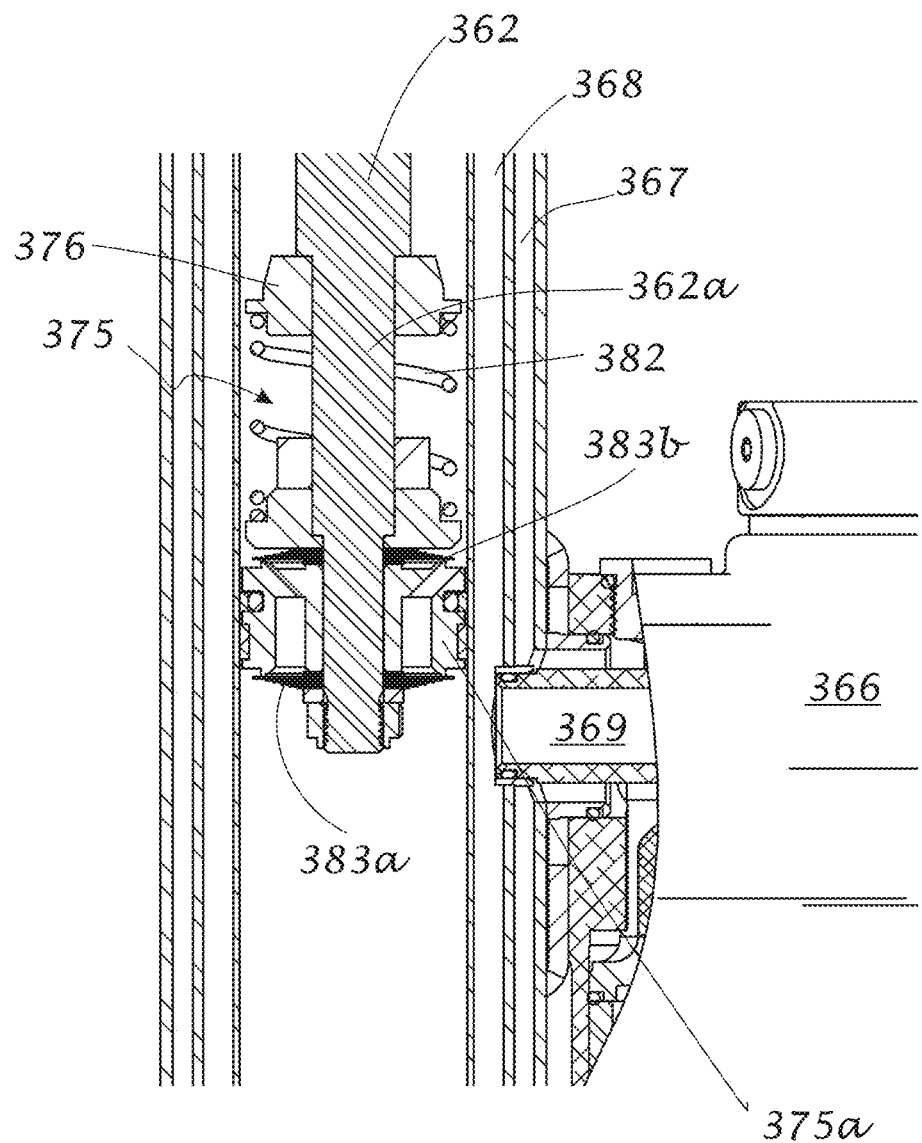
FIG. 38 illustrates a close-up of a portion of the cross section of FIG. 37.

FIG. 38, which shows an expanded view of a portion of FIG. 37, illustrates that the closure plug 376 is biased, be means of compressible member 382, against an annular shoulder formed between the outer diameter of piston rod 362 and the outer diameter of the first piston rod neck 362a. The compressible member may be, for example, a coil spring as is shown in FIG. 39. FIG. 39 also illustrates shim stacks 383a and 383b which act as BOVs.

The invention claimed is:

1. A bi-directional hydraulic diverter valve, comprising:
a first spool biased towards a first closed position;
a second spool biased towards a second closed position;
a first fluid flow path through the diverter valve; and
a second fluid flow path through the diverter valve;
a first bypass fluid flow path through the diverter valve;
a second bypass fluid flow path through the diverter valve;
wherein at a first operating point, wherein fluid flow in the first fluid flow path, in at least one mode of operation, causes the first spool to be displaced such that at least some of the fluid flowing in the first fluid flow path is diverted to the first bypass fluid flow path.

2. The bi-directional hydraulic diverter valve of claim 1, wherein at a second operating point fluid flow in the second flow path causes the second spool to be displaced such that at least some of the fluid flowing in the second fluid flow path is diverted to the second bypass fluid flow path.

3. The bi-directional hydraulic diverter valve of claim 2, wherein the first bypass fluid flow path and the second bypass fluid flow path are distinct flow paths.

4. The bi-directional hydraulic diverter valve of claim 2, further comprising at least one of a wave spring and a coil spring that biases the first spool to the first closed position.

5. The bi-directional hydraulic diverter valve of claim 4, wherein the at least one of the wave spring and the coil spring also biases the second spool to the second closed position.

6. The bi-directional hydraulic diverter valve of claim 1, wherein the first spool and the second spool are constrained to move axially.

7. The bi-directional hydraulic diverter valve of claim 1, wherein the first spool is biased against the second spool to bias the second spool towards the second closed position.

8. A bi-directional hydraulic diverter valve, comprising:
a first fluid flow path through the diverter valve;
a second fluid flow path through the diverter valve;
at least one spool biased toward a closed position; and
at least one bypass flow path through the diverter valve;
wherein at a first operating point, fluid flow in the first fluid flow path produces a force on the at least one spool that displaces the at least one spool such that at least some of the fluid flowing in the first fluid flow path is diverted to the at least one bypass flow path.

9. The bi-directional hydraulic diverter valve of claim 8, wherein the at least one spool valve includes a first spool valve and a second spool and the at least one bypass flow path through the diverter valve includes a first bypass flow path through the diverter valve and a second bypass flow path through the diverter valve, wherein at a second operating point fluid flow in the second fluid flow path produces a force on the second spool that at least displaces the second spool such that at least some of the fluid flowing in the second fluid flow path is diverted to the second bypass flow path.

10. The bi-directional hydraulic diverter valve of claim 9, wherein the first bypass flow path and the second bypass flow path are distinct flow paths.

11. The bi-directional hydraulic diverter valve of claim 8, further comprising at least one of a wave spring and a coil spring that biases the at least one spool toward the closed position.

12. A method of operating a diverter valve, comprising:
displacing a first spool valve biased towards a first closed position in response to fluid flowing through a first flow path in the diverter valve such that at least some of the fluid flowing through the first flow path is diverted to a first bypass flow path; and
displacing a second spool valve biased towards a second closed position in response to fluid flowing through a second flow path in the diverter valve such that at least some of the fluid flowing through the second flow path is diverted to a second bypass flow path.

13. The method of claim 12, wherein the first spool and the second spool form an integral unit.

14. The method of claim 13, wherein the first bypass fluid flow path and the second bypass fluid flow path are distinct flow paths.

15. The method of claim 13, further comprising biasing the first spool against the second spool to bias the second spool towards the second closed position.

* * * * *

UNITED STATES PATENT AND TRADEMARK OFFICE
CERTIFICATE OF CORRECTION

PATENT NO. : 9,702,424 B2  
APPLICATION NO. : 14/876796  
DATED : July 11, 2017  
INVENTOR(S) : Richard Anthony Zuckerman et al.

Page 1 of 1

It is certified that error appears in the above-identified patent and that said Letters Patent is hereby corrected as shown below:

At Column 17, Claim 1, Line number 46, please delete the word "wherein" (second occurrence) after the word "point," and before the word "fluid".

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*